United States Patent [19]

Smaha et al.

[11] Patent Number: 5,557,742
[45] Date of Patent: Sep. 17, 1996

[54] METHOD AND SYSTEM FOR DETECTING INTRUSION INTO AND MISUSE OF A DATA PROCESSING SYSTEM

[75] Inventors: Stephen E. Smaha; Steven R. Snapp, both of Austin, Tex.

[73] Assignee: Haystack Labs, Inc., Austin, Tex.

[21] Appl. No.: 208,019

[22] Filed: Mar. 7, 1994

[51] Int. Cl.$^6$ .................................................. G06F 11/34
[52] U.S. Cl. .................. 395/186; 371/67.1; 395/185.01
[58] Field of Search .............................. 395/575, 185.01; 371/15.1, 25.1, 24, 67.1, 22.4, 22.1

[56] References Cited

U.S. PATENT DOCUMENTS

| | | | |
|---|---|---|---|
| 4,672,609 | 6/1987 | Humphrey et al. | 371/21 |
| 4,773,028 | 7/1988 | Tallman | 364/550 |
| 5,210,704 | 5/1993 | Husseiny | 364/551.01 |

OTHER PUBLICATIONS

H. Debar, M. Becker, D. Siboni, "A Neural Network Component for an Intrusion Detection System", IEEE 1992, pp. 240–250.
D. Denning, "An Intrusion Detection Model", IEEE Transactions of Software Engineering, vol. SE–13, No. 2, Feb. 1987, pp. 222–232.
C. Dowell and P. Ramstedt, "The Computerwatch Data Reduction Tool", AT&T Bell Laboratories, pp. 99–108.
T. Garvey and T. Lunt, "Model–Based Intrusion Detection", Proceedings of the 14th National Computer Security Conference, Washington, DC, Oct. 1991, pp. 1–14.
H. Javitz and A. Valdez, "The SRI IDES Statistical Anomaly Detector", Proceedings of the 1991 IEEE Symposium on Security and Privacy, Oakland, CA, May, 1991, pp. 1–11.
L. Lankewicz and M. Benard, "Real–Time Anomaly Detection Using a Nonparametric Pattern Recognition Approach", Department of Computer Science, Tulane University, pp. 80–89.
G. Liepins and H. Vaccaro, "Anomaly Detection: Purpose and Framework", pp. 495–504.

T. Lunt and R. Jagannathan, "A Prototype Real–Time Intrusion–Detection Expert System,", Proceedings of the 1988 IEEE Symposium on Security and Privacy, Apr. 1988, pp. 1–8.
T. Lunt, "Automated Audit Trail Analysis and Intrusion Detection: A Survey", Proceedings of the 11th National Computer Security Conference, Oct., 1988, pp. 1–9.
T. Lunt, R. Jagannathan, R. Lee, A. Whitehurst, and S. Listgarten, "Knowledge–BasedIntrusion Detection", pp. 102–107.
M. Sebring, E. Shellhouse, M. Hanna, and R. Whitehurst, "Expert Systems in Intrusion Detection: A Case Study", pp. 74–81.

(List continued on next page.)

Primary Examiner—Robert W. Beausoliel, Jr.
Assistant Examiner—Phung My Chung
Attorney, Agent, or Firm—J. Nevin Shaffer; Shaffer & Culbertson

[57] ABSTRACT

A processing system intrusion and misuse detection system and method utilizes instructions for and steps of processing system inputs into events and processing the events with reference to a set of selectable misuses in a misuse engine to produce one or more misuse outputs. The system and method convert processing system generated inputs to events by establishing an event data structure that stores the event. The event data structure includes authentication information, subject information, and object information. Processing system audit trail records, system log file data, and system security state data are extracted from the processing system to form the event data structure. A signature data structure stores signatures that the misuse engine compares and matches to selectable misuses. The signature data structure includes an initial state for each selectable misuse, an end state for each selectable misuse, one or more sets of transition functions for each selectable misuse, and one or more states for each selectable misuse, which can include the end state or the initial state. Furthermore, a misuse output and an index are utilized so that for each selectable misuse element there is a mechanism for loading the signature data structure.

18 Claims, 5 Drawing Sheets

OTHER PUBLICATIONS

K. Fox, R. Henning, J. Reed, and R. Simonian, "*A Neural Network Approach Towards Intrusion Detection*", Harris Corporation, Government Information Systems Division, Jul. 2, 1990, pp. 125–134.

S. Smaha, "*Haystack: An Intrusion Detection System*", Proceedings of the IEEE Fourth Aerospace Computer Security Applications Conference, 1988, pp. 37–44.

S. Snapp, "*Signature Analysis and Communication Issues in a Distributed Intrusion Detection System*", MS Thesis, Division of Computer Science, University of California at Davis, 1991, pp. 1–40.

S. Snapp, J. Brentano, G. Dias, T. Goan, T. Heberlein, C. Ho, K. Levitt, B. Mukherjee, S. Smaha, T. Grance, D. Teal, and D. Mansur, "*DIDS (Distributed Intrusion Detection System)-Motivation, Architecture, and an Early Prototype*", Computer Security Laboratory, Division of Computer Science, University of California at Davis, pp. 167–176.

W. Tener, "*AI and 4GL: Automated Detection and Investigation and Detection Tools*", Computer Security in the Age of Information, Proceedings of the Fifth IFIP International Conference on Computer Security, May 19–21, 1988, pp. 23–29.

W. Tener, "*Discovery: An Expert System in the Commercial Data Security Environment*", Computer Security Journal, vol. VI, Number 1, pp. 45–53.

H. Teng, K. Chen, and S. Lu, "*Adaptive Real–Time Anomaly Detection using Inductively Generated Sequential Patterns*", 1990 IEEE, pp. 278–284.

H. Vaccaro and G. Liepins, "*Detection of Anomalous Computer Session Activity*", 1989 IEEE, pp. 280–289.

W. Weiss and A. Baur, "*Analysis of Audit and Protocol Data Using Methods from Artificial Intelligence*", Siemens AG, West Germany, pp. 109–114.

J. Winkler, "*A UNIX Prototype for Intrusion and Anomaly Detection in Secure Networks,*" Proceedings of the 13th National Computer Security Conference, Oct., 1990.

"A Pattern–Oriented Intrusion–Detection Model and Its Application" by Shieh and Gligor; 1991.

"The NIDES Statistical Component Description and Justification" by Javitz and Valdes; Mar. 7, 1994.

METHOD AND SYSTEM FOR DETECTING INTRUSION INTO AND MISUSE OF A DATA PROCESSING SYSTEM

TECHNICAL FIELD OF THE INVENTION

The present invention relates to data processing systems and, more specifically, to a method and system for detecting intrusion into and misuse of a data processing system. Even more specifically, the present invention relates to a method and system for automatically recognizing intrusions into and misuses of one or more data processing systems that minimizes creation of false positive misuse reports, eliminates the need for expert system programmers to enter knowledge database rules, and permits rapid processing of data from multiple systems using a single computer.

BACKGROUND OF THE INVENTION

Misuse detection is the process of detecting and reporting uses of processing systems and networks that would be deemed inappropriate or unauthorized if known to the responsible parties. Even though designers, owners, and administrators of systems and networks usually try to prevent misuses, the complexity of modern system environments and the difficulty of preventing authorized users from abusing their privileges make it virtually impossible to anticipate and prevent all possible security problems. To date, however, there is no known system or method for effectively and independently detecting and reporting misuses and facilitating their subsequent investigation.

The direct financial impact of computer misuse is very high and increasing. The National Institute of Justice (NIJ), for example, estimates the cost of computer misuse in the U.S. during 1993 to range from $500 million to $5 billion dollars. In addition, NIJ estimates that $2.1 billion was lost in the same period from telephone service fraud through illegally manipulating telephone company computer systems. In fact, virtually every sector of modern commerce and government, from banking to national defense, depends on the security of processing systems on which the sectors rely. As an increasing number of organizations connect their internal networks to outside public networks (e.g. the Internet, "National Information Infrastructure", etc.), the potential importance of misuse increases. This is because vulnerability increases with increased exposure.

Processing system misuse detection and reporting research has been funded by U.S. government agencies who have concerns for the confidentiality of their computer systems. Researchers have generally been associated with large research organizations or national laboratories. These institutions have required detailed knowledge of technical computer security, known threats and vulnerabilities, protection mechanisms, standard operational procedures, communications protocols, details of various systems' audit trails, and legal investigation of computer crimes. This misuse detection and reporting research has followed two basic approaches: anomaly detection systems and expert systems, with the overwhelming emphasis on anomaly detection.

Anomaly detection looks for statistically anomalous behavior. It assumes that intrusions and other security problems are rare and that they appear unusual when compared to other user behavior. D. Denning, "An Intrusion Detection Model," Proc 1986 IEEE Symp. Security & Privacy, (April 1986) provides an anomaly detection model (hereinafter the "Denning Model") for detecting intrusions into computer systems. The Denning Model uses statistical profiles for user, dataset, and program usage to detect "exceptional" use of the system.

There are variations of the Denning Model of anomaly detection models and different applications of these models. Anomaly detection techniques such as those based on the Denning Model, however, have generally proven to be ineffective and inefficient. Anomaly detection techniques, for instance, do not detect most actual misuses. The assumption that computer misuses would appear statistically anomalous has been proven false. When scripts of known attacks and misuses are replayed on computers with statistical anomaly detection systems, few if any of the scripts are identified as anomalous. This occurs because the small number of commands in these scripts are insufficient to violate profiling models.

In general, anomaly detection techniques can not detect particular instances of misuses unless the specific behaviors associated with those misuses also satisfy statistical tests without security relevance. Anomaly detection techniques also produce false alarms. Most of the reported anomalies are purely statistical and do not reflect security problems. These false alarms often cause system managers to resist using anomaly detection method because they increase the processing system workload without substantial benefits.

Another limitation with anomaly detection approaches is that users activities are often too varied for a single profile can result in many false alarms. Statistical measures also are not sensitive to the order in which events occur, and this may prevent detection of serious security violations that exist when events occur in a particular order. Profiles that anomaly detection techniques use also may be vulnerable to conscious manipulation by users. Consequently a knowledgeable perpetrator may train the thresholds of detection system adaptive profiles to accept aberrant behaviors as normal. Furthermore, statistical techniques that anomaly detection systems use require complicated mathematical calculations and, therefore, are usually computationally expensive.

Expert systems (also known as rule-based systems or production systems) have had some use in misuse detection, generally as a layer on top of anomaly detection systems for interpreting reports of anomalous behavior. Since the underlying model was anomaly detection, they have the same drawbacks of anomaly detection techniques.

Expert system approaches, in addition, are themselves inherently inefficient. S. Snapp, et al., "DIDS (Distributed Intrusion Detection System)" Proc. 14th Nat'l Computer Security Conf., Washington, D.C. (October 1991) describes one example of an expert system signature analysis model that detects misuse by looking for one specific event within a specific system context. In one study, this detection system was found to be two and four orders of magnitude slower than "hard-wired" techniques and much too slow for real-time operation. This also makes it impractical to use these systems to detect and report misuses of multiple associated processing systems through operation of a single misuse detection and reporting system.

Expert systems approaches are also not deterministic. Consequently, these rules are expressed in a declarative, non-procedural fashion. When rule changes occur, it is generally extremely difficult to predict how the new system will behave. This makes development and testing more complex and expensive. Moreover, expert system approaches are limited to the knowledge of the expert who programmed the rules into the system. However, an expert is only capable of programming the rules for behavior that the expert knows. Since there are often many different paths to a particular misuse, the expert will unable to create rules that represent all of these paths.

Consequently, there is a need for a method and system that provides an independent capability for detecting and reporting misuses and facilitating their subsequent investigation.

There is a need for a method and system for automatically recognizing intrusions and misuses of one or more data processing systems that minimizes the number of false positive misuse reports, eliminates the need for expert system programmers to enter knowledge database rules, and permits rapid processing of data from multiple systems using a single computer.

SUMMARY OF THE INVENTION

The present invention, accordingly, provides a method and system for detecting intrusion and misuse of data processing systems that overcomes limitations associated with known detection methods and systems. The present invention provides a method and system for intrusion and misuse detection that minimizes the number of false positive misuse reports eliminates the need for expert system programmers to enter knowledge database rules in a system, and permits rapid processing of data from multiple systems using a single computer.

According to one aspect of the invention, there is provided an intrusion misuse detection and reporting system that uses processing system inputs, which include processing system audit trail records, system log file data, and system security state data information for further analysis to detect and report processing system intrusions and misuses. A misuse selection mechanism allows the detection system to analyze the process inputs for a selected subset of misuses. The processing system inputs are then converted into states which are compared, through the misuse engine, to a predefined set of states and transitions until a selected misuse is detected. Once a misuse has been detected, an output mechanism generates a signal for use by notification and storage mechanism. The detection system then generates a text-based output report for a user to view or store.

A technical advantage of the invention is that it improves on previous misuse detection systems by minimizing the number of false positives. This is achieved by creating signatures from undesirable activities including known attack outcomes, known system vulnerabilities and known attack procedures. Since a misuse is only reported upon a direct match to a known misuse signature, the probability of falsely reporting a misuse is reduced over the previous anomaly detection mechanisms.

An additional technical advantage of the invention is that it eliminates the need for expert programming in knowledge-based or rule-based systems. The signatures that the present invention uses are generated by a programmer and are loadable at program initiation. System programmers are capable of creating their own misuse signatures from their particular known attack procedures, attack outcomes, and known system vulnerabilities. Misuse signatures that the present invention uses are deterministic, unlike expert systems. This significantly simplifies development and testing in response to an intrusion or a misuse.

A third technical advantage of the invention is that it uses an efficient match and compare method to improve speed. The elimination of the need to maintain statistical histograms, compute statistical deviations, and process rules in a knowledge-based system enables the invention to process data more efficiently, thereby increasing the number of systems whose data can be processed by a single misuse engine.

BRIEF DESCRIPTION OF THE DRAWINGS

The invention and its modes of use and advantages are best understood by reference to the following description of illustrative embodiments when read in conjunction with the accompanying drawings, wherein.

DETAILED DESCRIPTION OF THE INVENTION

The illustrative embodiments of the present invention are best understood by referring to the FIGUREs, wherein like numerals are used for like and corresponding parts of the various components.

Figure 1:
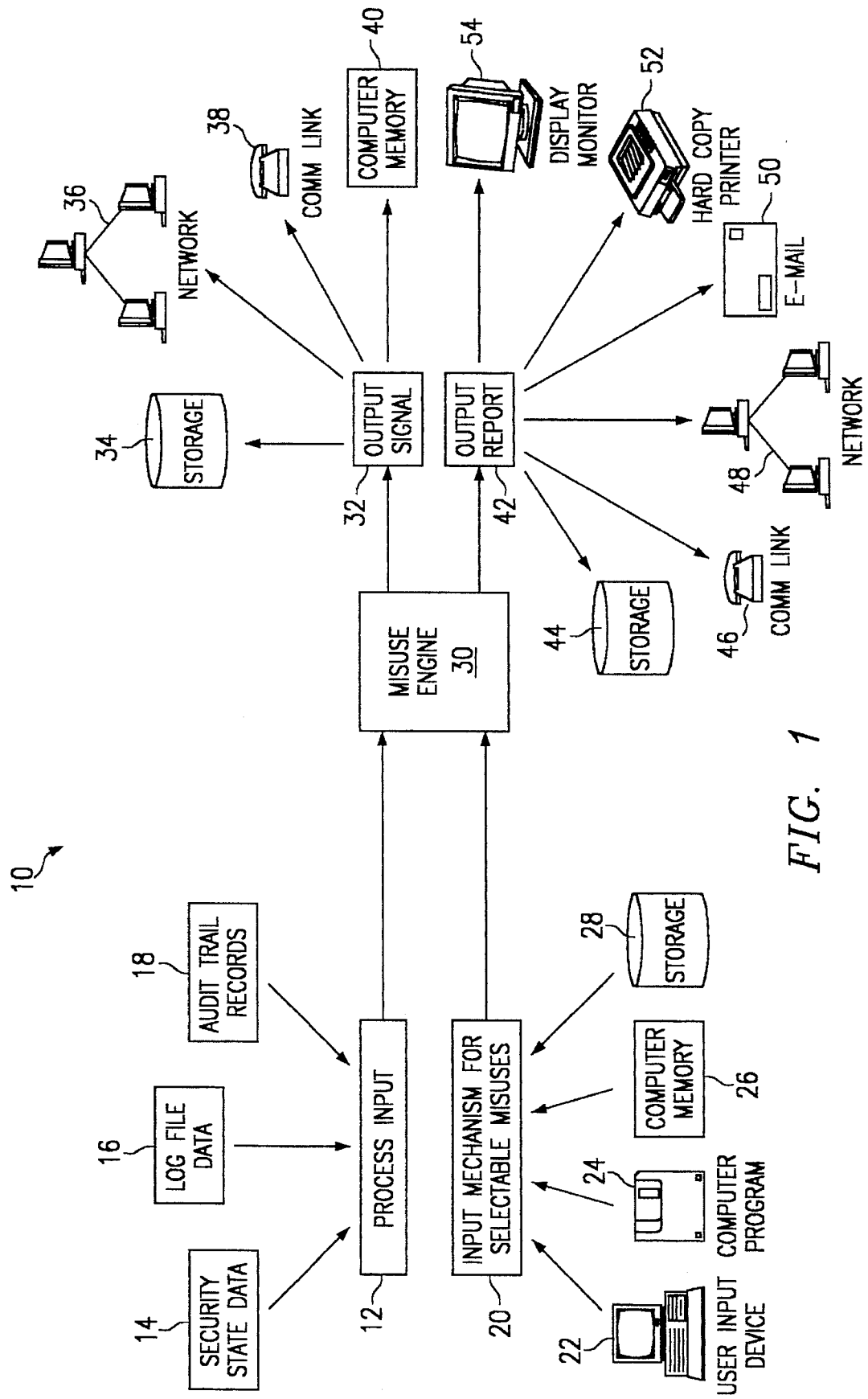
FIG. 1 is a diagram of the architecture of the present embodiment.

FIG. 1 shows the overall architecture of detection system 10 according to one embodiment of the present invention. Process input mechanism 12 receives input from security state data source 14, log file data source 16, and audit trail records source 18. Input mechanism 20 for selectable misuses may receive input from any of a wide array of sources, including for example, user device 22, computer program 24, computer memory 26, or computer storage device 28. Process input mechanism 12 and input mechanism 20 for selectable misuse each provide inputs to misuse engine 30.

From misuse engine 30, a misuse signal may go to output signal mechanism 32 and output report mechanism 42. Output signal mechanism 32 may send output signals to a wide variety of output signal paths including, for example, storage device 34, network device 36, communications link 38, and computer memory device 40. Output report mechanism 42 may send output report signals to a wide variety of output report paths, including, for example, storage device 44, communications link 46, network device 48, electronic mail facility 50, hard copy printer device 52, and display monitor 54.

Within the architecture that FIG. 1 depicts, therefore, detection system 10 provides a set of instructions and functions that use processing input mechanism 12 and input mechanism 20 for selectable misuses to activate misuse engine 30 to generate output signals for output signal mechanism 32 and output report signals for output report mechanism 42.

To assist in fully describing the present embodiment of detection system 10, the following terms are used with the following definitions. Note, however, that although a term may be herein defined, this does not necessarily exclude an established definition for the term if using the established definition is consistent with the purpose and scope of the present invention. Notwithstanding, as used herein an "event" is an instant security state of the system. A "transition function" is a set of instructions that defines the set of conditions for which a transition to an event occurs. A "signature" is the set of events and transition functions that define the sequence of actions that form a misuse. A "misuse" is any act that a processing system manager or other party responsible for the processing system deems unacceptable and undesirable and includes known attack outcomes, attempts to exploit known system vulnerabilities, and typical outcomes of system attacks. A "selectable misuse" is one of the plurality of misuses that the present embodiment can detect and report. A "misuse output" is both a signal for further output processing and a displayable text signal for a computer to display, a printer to print, or storage device to store.

The term "misuse engine" is the set of instructions that the present embodiment uses to match and compare functions using processing system events and transition functions for locating misuses. "System inputs" include (1) system audit trail records; (2) processing system log file data; and (3) processing system-maintained security state data. "Authentication" entails associating a user with a system identifier. A "subject" is an active entity, generally in form of a person, process, or device, that causes information to flow among objects or changes in the processing system state. An "object" is a passive entity that contains or receives information. Access to an object implies access to the information it contains.

With the above definitions, the present embodiment may be understood as detection system 10 that uses process inputs 12 to detect security violations and intentional and unintentional misuses. System security state data source 12 provides processing system specific information that is relevant to processing system security and that is not available either from system audit trail records source 18 or system log file data source 16. This information is typically transient information which is subject to change based on the current activities on the processing system. Processing system log file data source 14 provides information other than that held by system audit trail records source 18 and relating to system activity and transactions. System log file data is created and written by system applications and system utilities that were first implemented prior to the availability of the data that is available from system audit trail records source 18. Additionally, third party applications and programs that are used on many different types of processing systems may use their own form of logging rather than rely on records from system audit trail records source 18.

Records from system audit trail records source 18 are special purpose files that maintain information about system activity and transactions. The associated processing system usually maintains audit trail records source and does not allow general program or user access to the records that audit trail records source 18 contains. Additionally, records from audit trail records source 18 generally require that data be written in a particular format and may only allow other programs to write to audit trail records source 18 in a specific format or under certain conditions. This formatted information may be called an audit record.

Data and records from security state data source 15, log file data source 16, and audit trail records source 18 serve as process inputs that allow process input mechanism 12 to reconstitute actual events that occur within the processing system. Misuse engine 30 uses these events to determine the existence of an actual processing system misuse. Before misuse engine 30 begins processing, however, input mechanism 20 for selectable misuses permits narrowing the scope of analysis to a specified set of misuses. Misuse engine 30 then begins converting process inputs 12 into events and compares the events to signatures. Misuse engine 30 generates a misuse output upon detecting a misuse during processing system operation. The misuse output consists of two outputs. One output is output signal 32 which misuse engine 30 may send through output signal mechanism 32 to one or more of storage device 34, network 36, communications link 38 and computer memory device 40. The other possible output from misuse engine 30 goes to output report mechanism 38. Output report mechanism 38 may send output reports to one or more of storage device 44, communications link 46, network 48, electronic mail facility 50, hard copy printer device 52, and display monitor device 54.

Figures 2A, 2B:
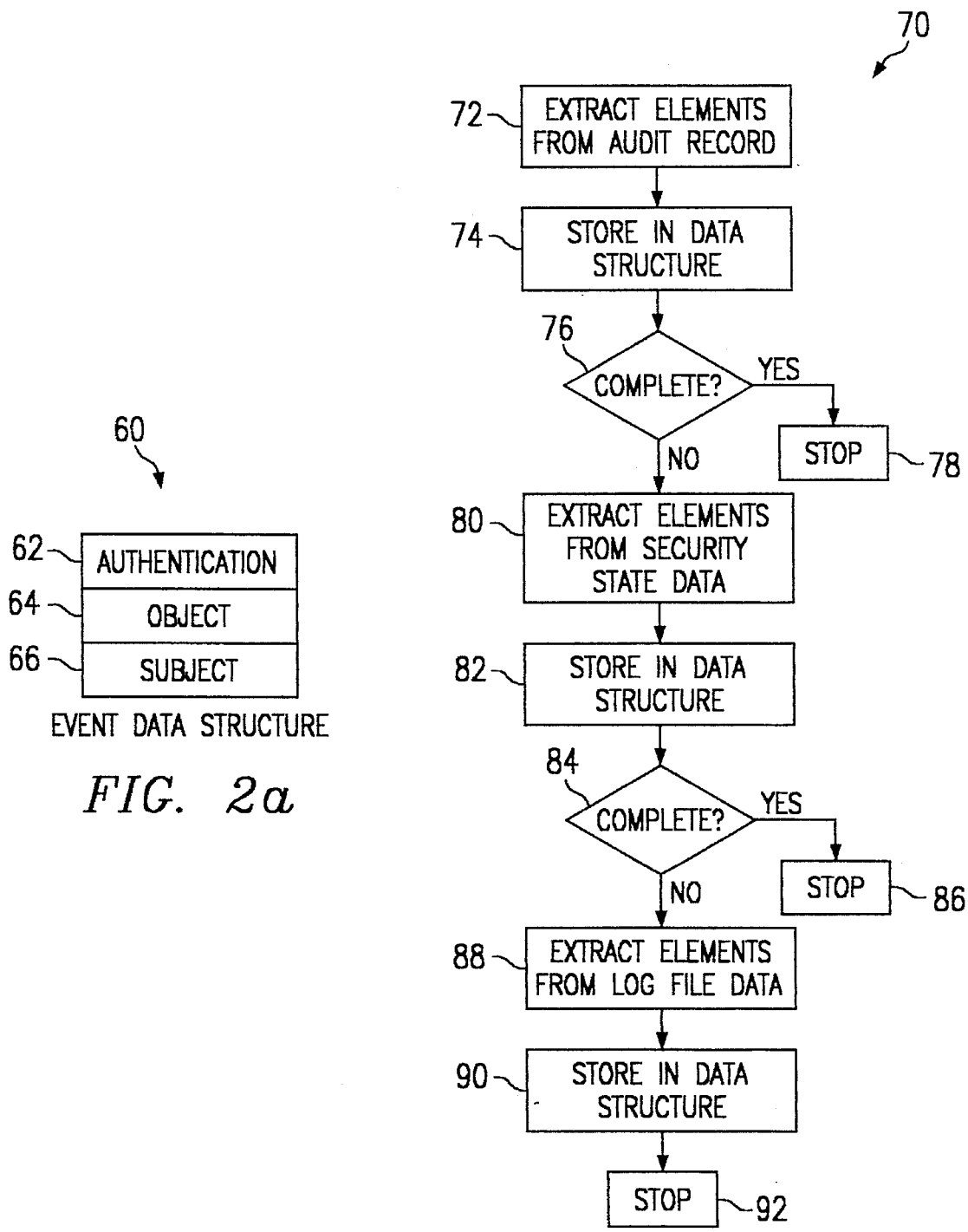
FIGS. 2a and 2b illustrate a data structure that the present embodiment uses for storing events and the method of the present embodiment for converting audit trail records into processing system security state events.

FIGS. 2a and 2b describe the structure and process applicable to detection system 10 of the present embodiment. FIG. 2a, for instance, describes the contents of the data structure for an event. Data structure 60 describes the necessary information modules for an event including: authentication information module 62, object information module 64, and subject information module 66.

Authentication information module 62 includes the information that uniquely identifies a user to the system. This module contains information to ensure that detection system 10 attributes misuses to the appropriate responsible party. For more information on the purpose of authentication module 62, see the Department of Defense Trusted Computer System Evaluation Criteria DOD 5200.28-STD, (December 1985) ("TCSEC"). For more information on audit trail contents, see TCSEC.

Object information module 64 includes information that describes the entity upon which detection system 10 acts. In computers, examples of objects are files, memory devices, disk blocks, processes and networks. Anything that is capable of storing information upon which a processing system can act is an object, even if the act of storing the information is only transient. Additional computer objects are hardware registers, hardware selectable states on chips, EEPROMs, and all kinds of RAM. In telecommunication systems, such as telecommunication switching devices, objects include devices such as trunks, lines, bridges, routers, and databases. In process control environments, objects include the machines being controlled, such as robots, ovens, and optical devices.

Subject information module 66 contains information about the actor and activity with which an object associates. Actors may include users and processes (or programs). Activities are those actions that may affect the status of an object, or that permit access to an object. Examples of activities may include such things as creation, deletion, reading, writing, modifying, connecting, routing, and copying.

FIG. 2b shows flow chart 70 to describe the method of the present embodiment for converting security state data from security state data source 14, log file data from log file data source 16 and audit trail records from audit trail records source 18 into information applicable to event data structure 60 of FIG. 2b. The method of the present embodiment examines the contents of security state data source 14, the log file data source 16, and, audit trail records source 18 to load all the elements of the event data structure 60. Information for authentication information module 62, object information module 64 and subject information module 66 can reside in any of security state data source 14, log file data source 16, or audit trail records source 18.

An audit trail is comprised of one or more audit records. An audit trail usually has numerous audit records covering a specific period of time for the particular system being audited. The method of flow chart 70 for converting an audit trail to an event examines, at step 72, one audit record 18 at a time to extract elements from the audit trail record and determine whether it includes all the information necessary to create an event. The process stores in event data structure 60 any information in the audit trail record that is relevant to information for authentication information module 62, object information module 64, or subject information module 66. This occurs at store in data structure step 74.

The method then continues to examine the contents of each audit trail record to exact the necessary elements to load all the elements of event data structure 60. If event data structure 60 is complete, for which complete query 76 tests, then the process flow terminates at stop step 78. If the event data structure 60 is not complete, then the process examines the contents of data from security state data source 14 the extract necessary elements from security state data at step 80. System security state data can contain information relevant to authentication information module 62, object information module 64, or subject information module 66. Authentication information module 62 includes mappings of identification numbers to identification names. Object information module 64 includes hardware configurations or the processing system state such as which trunks are active on a switching system or which communications lines are active. Subject information module 66 includes information relating to who is or was accessing the system at a particular time. Any necessary information from the processing system state data is stored into one or more of authentication information module 62, object information module 64, or subject information module 66 at store in data structure step 82.

If event data structure 60 is complete, for which complete query 84 tests, process flow 70 terminates at stop step 86. If event data structure 60 is not complete, process flow 70 continues by examining the contents of the log file data source 16 and extracting necessary elements for data structure 60 at step 88.

Log file data source 16 includes information about subjects and objects in the processing system that may not be included in audit trail records source 18. Examples of such log file data are/usr/adm/messages on UNIX™ systems which contain information that derive from system processes. Additional examples include system printer accounting files and system accounting files. See the SunOS™ Reference Manual for additional descriptions of other UNIX™ log files. UNIX™ is a trademark of Unix System Laboratories, Incorporated. SunOS™ is a trademark of Sun Microsystems Computer Corporation.

Log file data from log file data source 16 may also be the result of operating specific applications such as database programs, telecommunications call processing programs, or production line management programs. Any necessary information from log file data source 16 is stored into either authentication information module 62, object information module 64, or subject information module 66 of event data structure 60 at store in data structure step 92. Following the above steps, process flow 70 terminates at stop step 92. Note that since there are no further sources of information available process flow 70 terminates. It is possible at this point, however, for the authentication information, module 62 subject information module 64 and object information module 66, however, to be incomplete at this stage.

Figure 3:
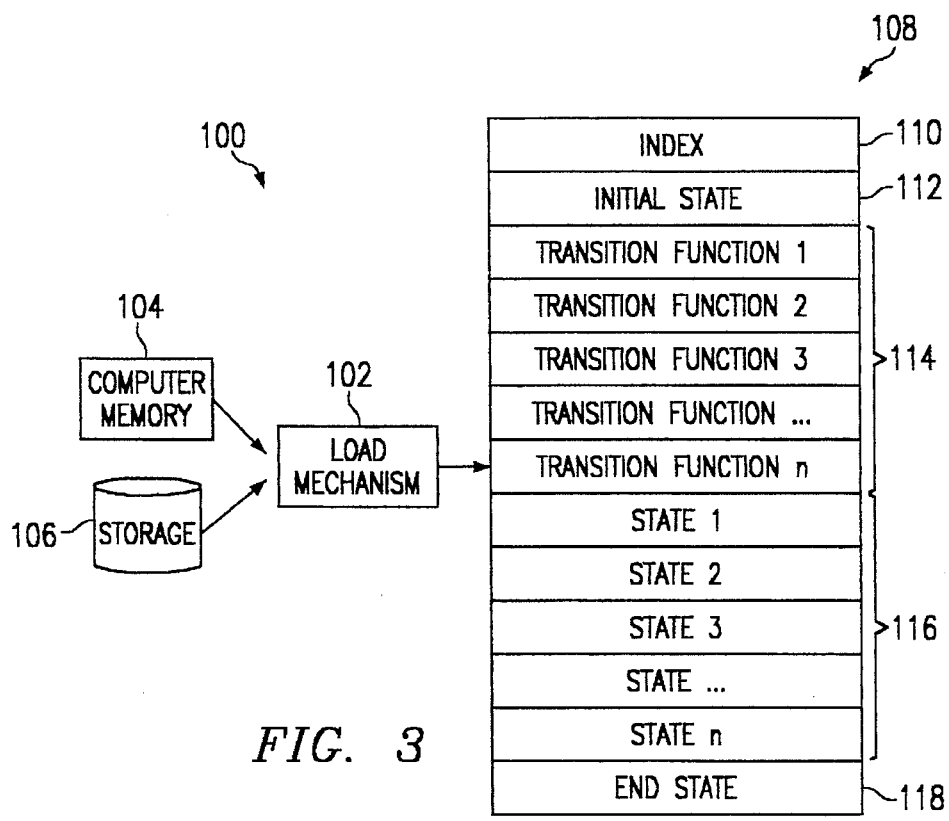
FIG. 3 describes the data structure of FIG. 2a that the present embodiment uses to store computer misuses representations.

FIG. 3 describes process flow 100 for operation of the data structure load mechanism and the elements of the data structure according to the present embodiment. In process flow 100, load mechanism 102 receives selectable misuse data from computer memory device 104 and from storage device 106. Relating FIG. 3 to FIG. 1, computer memory 104 may be thought of as computer memory 26. Storage device 28 and load mechanism 102 may be thought of as part of input mechanism 20 for selectable misuses. From these inputs, load mechanism 102 creates signature data structure 108. Load mechanism 102 loads the misuse elements to signature data structure 108 and creates index 110. Signature data structure 108 may be loaded from a predefined area of computer memory device 106 or from a predefined stored image that storage device 104 holds. The predefined stored images include stored representations of the remaining portions of signature data structure 108. A programmer or a misuse compiler or other software program could generate these images. Load mechanism 102 may also receive predefined elements from computer memory 106. This allows cooperating programs to control which misuses are available to misuse engine 30.

Signature data structure 108 of the present embodiment contains the elements of a signature including index 110, initial state 112, transition functions 114, states 116, and end state 118. Taken together elements 112, 114, 116 and 118 embody a computer representation of a misuse, herein referred to as signature data structure 108. The computer representation of a misuse is created by a program or programmer from descriptions of misuses. These descriptions are converted into elements which are loaded by the present embodiment into a signature data structure 108. Transition functions 114 define the actions that must occur prior to transitioning to a new state. For example, in a telecommunication switching system a transition function 114 may look to determine if the trunk line is idle for 3 seconds. In a personal computer, a transition function 114 may look for a process change from an unprivileged mode to a privileged mode.

Each transition function 114 has an associated new state 116. A state is a collection of associated transition functions. Each state has one or more transition functions that lead to new states, except for end state 118. Initial state 112 is the start state for each signature. End state 118 is the state that conclusively identifies the previous actions and states as culminating in a misuse. It has no transition functions associated with it, because end state 118 signals that a misuse has occurred. The use of end state 118 is more fully described in FIG. 5b. Transition functions 114 and states 116 define all the activities and states that must occur between initial state 112 and end state 118 to identify a particular misuse.

Figure 4:
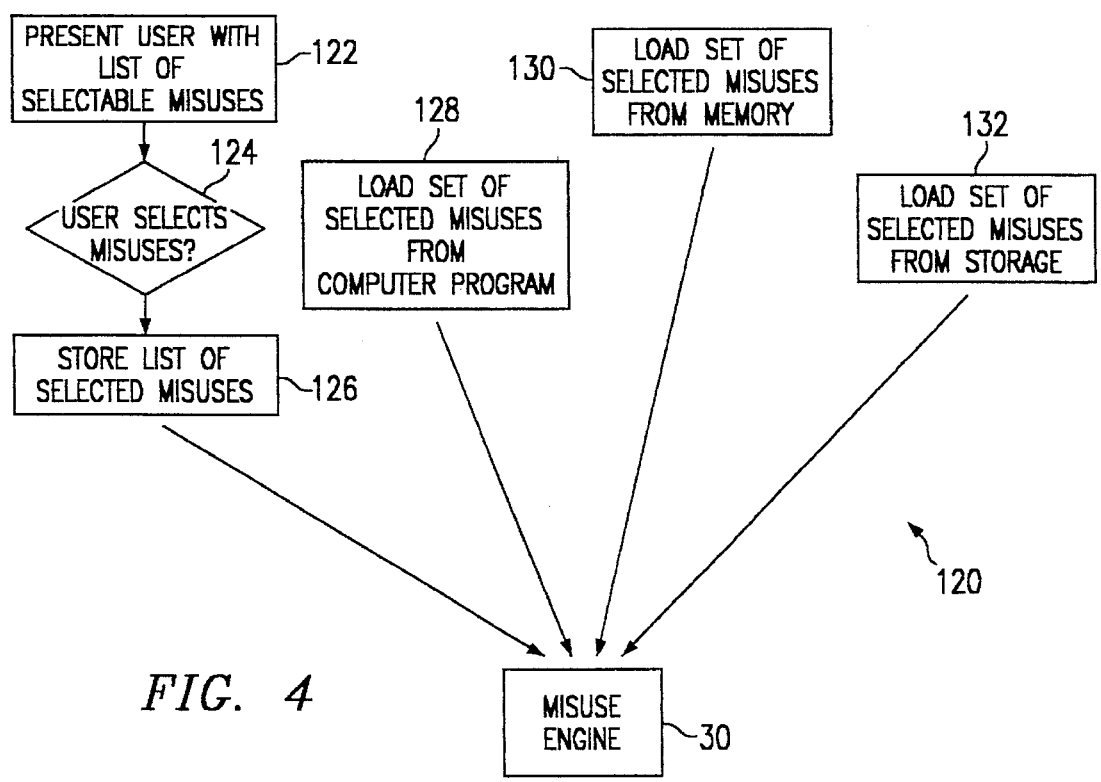
FIG. 4 illustrates one method for selecting misuses that the present embodiment employs.

FIG. 4 more particularly describes the inputs to in put mechanism 20 of FIG. 1 that provide a signature data structure selection process 20 for selecting which instances of signature data structure 108 to process. Selection process 120 allows a user to control the present embodiment to further limit the misuses for which to search from the maximum set of all misuses. Several sources, as already briefly identified in FIG. 1, can control which misuses to select. For example, a user may control input mechanism from a list of selectable misuses or use another type of input device 22 using steps 122 through 126. Alternatively, a user may load a set of selected misuses from computer program 24 at step 128. A set of misuses may also be loaded from memory device 26 at step 130. Furthermore, a set of selected misuses may also be loaded from storage device 28 at step 132. User selection of misuses may include, for example, the steps of presenting the user with a predefined list of selectable misuses as step 122 depicts. Then the process may query whether the user has selected pertinent misuses according to step 124. At step 126, the selection process stores the list of selected misuses for further processing by misuse engine 30. Computer program 26 selection of misuses that block 128 represents allows selecting misuses without requiring user input. For example, this includes programs that load previously selected misuses into misuse engine 30 or programs that dynamically select the misuses for which to search based on a set of criteria. This allows misuse engine 30 to process selected misuses and operate in an unattended mode.

Loading selected misuses from memory device 26, as block 130 represents, and loading selected misuses from a storage device, as block 132 depicts, effectively accomplishes the same function as program selection according to block 128. These loading mechanism allow detection system 10 of the present embodiment to run a predefined set of selected misuses through input mechanism 20 to misuse engine 30. The set need not be the same every time, but the selections are predefined in that no additional user input is necessary prior to processing through misuse engine 30.

Figure 5A:
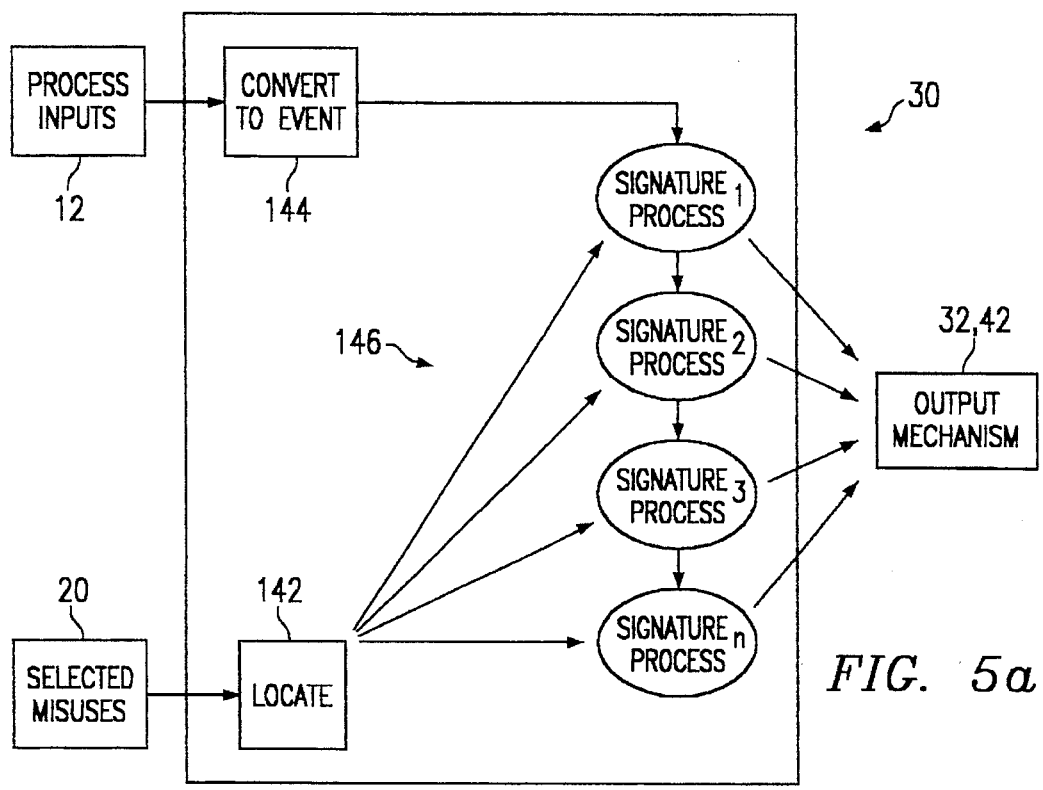
FIGS. 5a and 5b depict various aspects of misuse engine processing according to the present embodiment.
Figure 5B:
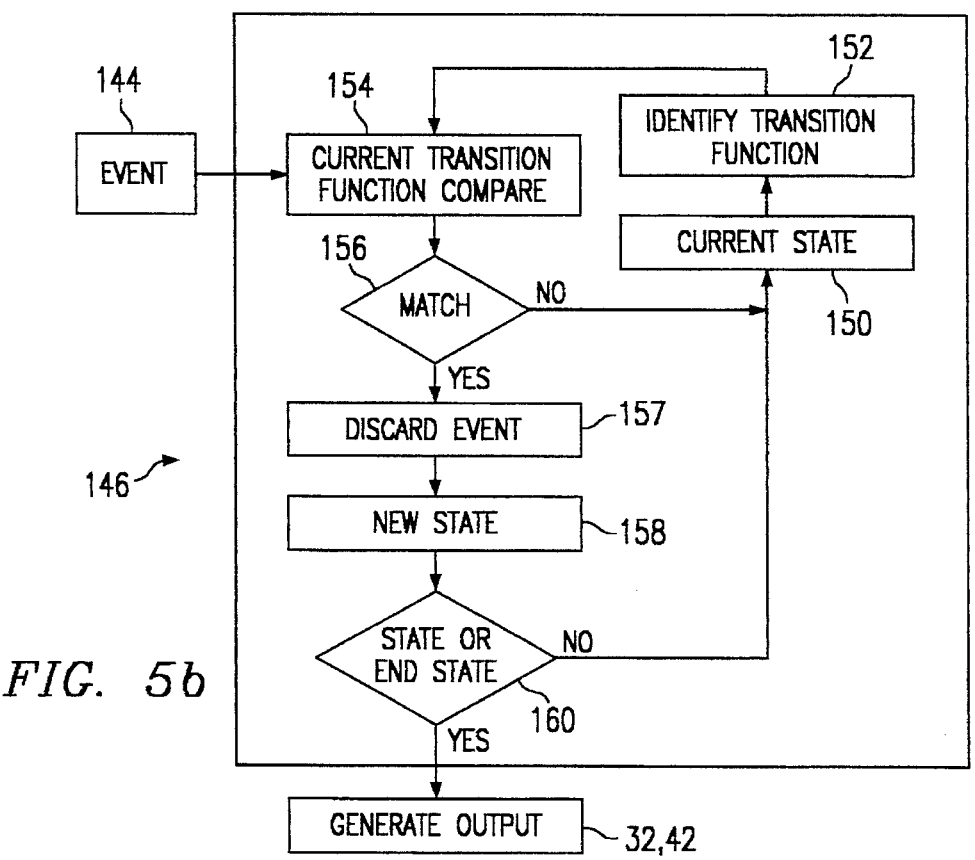

FIGS. 5a–5b describe the operation of misuse engine 30 according to the present embodiment. Referring to FIG. 5a misuse engine 30 receives inputs from input mechanism 20 of selected misuses and from process inputs mechanism 12. Misuse engine 30 results may go to various output mechanisms, including, for example, output signal mechanism 32 and output report mechanism 42. A first step is to locate the selected misuses and define a processing stream. For this purpose, locate mechanism 142 of FIG. 5a operates as part of misuse engine 30 to receive as inputs from selected misuses input mechanism 20 and uses signature data structure 108. For each selected misuse, detection system 10 uses index 110 of signature data structure 108 to locate from signature data structure 108 the initial state 112, and the sets of transition functions 114. In addition, index 110 defines for the present embodiment the appropriate sets of states 116, as well as end state 118. Thus, for each misuse there is an initial state 112 in the present embodiment.

The sets of states 116 that the present embodiment locates from data structure 108 may be as empty or large as necessary to represent all the states in the sequence of actions which result in the misuse. Any set of events may also include the initial event 112 or events in previous sets. The effect of transitioning to the initial state is to reset the sequence of actions to the initial state.

With the present embodiment, there is no requirement of time ordering or directional processing between transition functions and states. However, signature data structure 108 may use temporally-defined transitions. This is materially from different expert systems which cannot support temporally-ordered or temporally-defined transitions. The combination of unlimited transition functions and states also allows the representation of any pattern of events. This is also in contrast with previous signature analysis techniques which are directionally limited. Additionally, detection system 10 makes it possible to use system level events rather than simple user level commands.

Referring again to FIG. 5a, another aspect of misuse engine 30 is that it converts the process inputs 12 into events at convert to event step or mechanism 144. Convert to event mechanism 144 processes the process inputs according to the method defined in FIG. 2 and generates events. This conversion occurs continuously until the processing is terminated by either exhausting the audit trail records or by the method being interrupted. Each event generated by step 144 is passed through each signature process which collectively use reference manual 146.

The present embodiment processes the events generated in convert to event step 144 according to the signature process step 146 of FIG. 5b. Processing begins in the initial state 112 which has previously been identified from signature data structure 108. The initial state is marked as the current state 150. The first of the associated transition functions from signature data structure 108 is identified in step 152. This transition function portion of signature data structure 108 is identified as block 152. This transition function then passes to the recently converted event from convert to event step 144. The event from convert to event step 144 is then compared with the transition function at current transition function compare step 154.

Query 156 tests whether a match occurs. If not, processing flow reforms to current state step 150. Processing the same event repeats through steps 150 and 156 until there are no more transition functions associated with the current state, or a match is found. If no match is found between the event and any of the transition functions, the detection system 10 discards the event is discarded from the signature data structure 108.

If a match occurs, on the other hand, the transition function first discards the event at step 157 and then identifies the new state from the signature data structure 108 at step 158. The new state may be any of the initial state 112, the end state 118, or any other state 116. Query 160 then tests the new state to see if it is the end state 118 from signature data structure 108. If it is not, end state 118 the process marks the identified state as current state 150. If the new state is end state 118 then process flow goes from step 160 for two additional steps take place. The process first generates a misuse output according to output signal mechanism 32 and may generate an output report signal for output report mechanism 42. Next, the process loads the initial state 112 as the current state.

Discard event function 157 returns the event to the misuse engine 30. Returning to FIG. 5a, if there are additional signatures to be processed, the event is passed to the next signature in 146. All events are processed through signature process mechanism in 146 according to the steps defined in signature process 148. If there are no further signatures to be processed, the next event is generated in convert to event step 144.

Figure 6A:
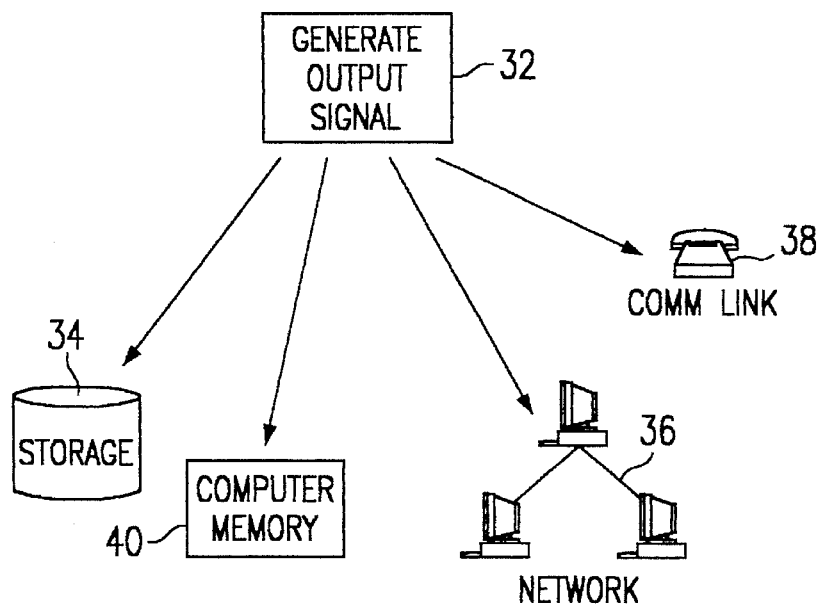
FIGS. 6a and 6b illustrate operation of the output mechanism of the present embodiment; and Appendix A provides source code listings of selected modules of one embodiment to further illustrate one way to practice the present invention.
Figure 6B:
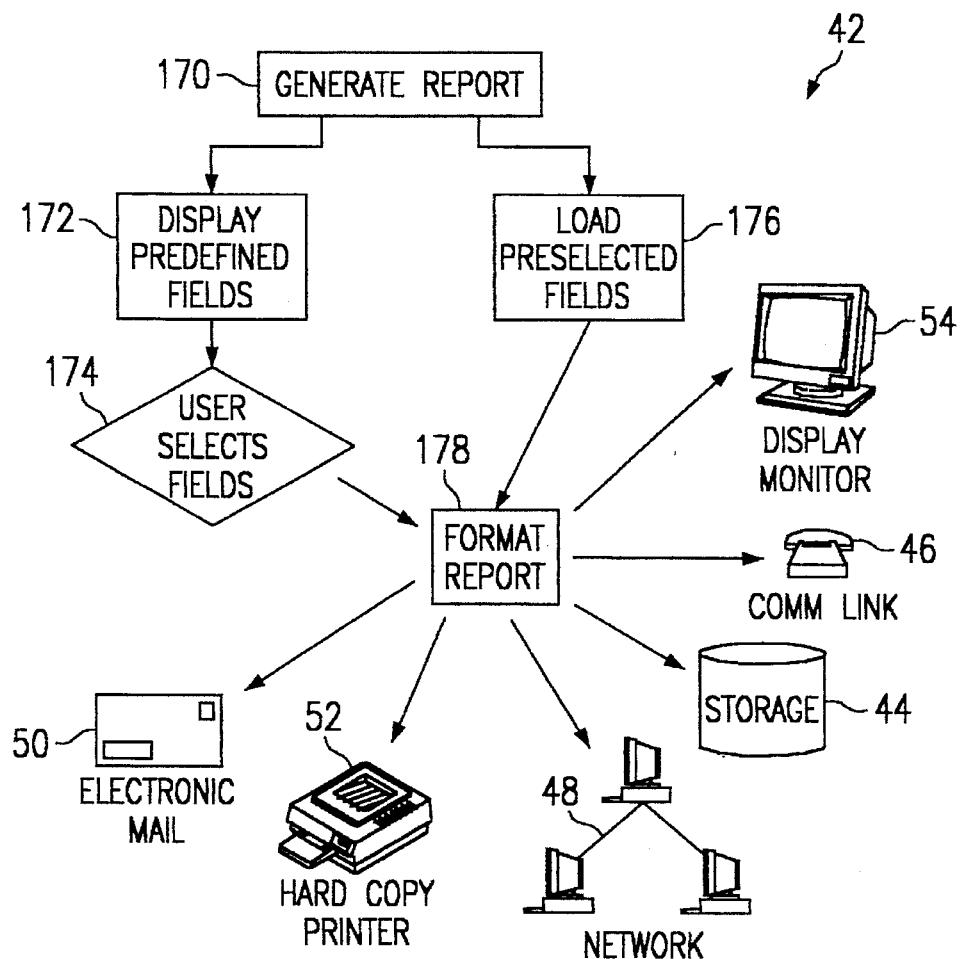

FIGS. 6a and 6b help to more fully describe the output mechanisms of the present embodiment, including output signal mechanism 32 in FIG. 6a and output report mechanism 42 in FIG. 6b. Turning to FIG. 6a, output signal mechanism 32 generates an output signal capable of being sent to a number of destinations including one or more of storage device 34, computer memory device 40, network 36, and communications link 38. Output signal mechanism 32 accommodates further processing or notification as may be necessary. For example, many processing systems support sophisticated event notification and alarm systems. Output signal mechanism 32, therefore, may be placed in computer memory device 40 and used to set an event or alarm. The output signal could also be written to storage device 44 for later statistical analysis. Output signal mechanism 32 could also send an output signal over communications link 38 to activate a paging system and notify an operator that a misuse has occurred. In order to facility processing by a wide variety of systems, the output signal from output mechanism 32 may be an ASCII text message.

In FIG. 6b, output report mechanism 42 produces a formatted ASCII report at step 170. The report can be generated either by displaying to the user a menu of predefined fields, according to display predefined fields step 172 from which a user may select fields and for which user selected fields query 174 tests. Alternatively, output mechanism in 42 may load preselected fields per load preselected fields step 176. Preselected fields may be loaded into the report formatter from storage or memory. Once the report fields are selected, report formatting occurs according to format report step 210. The report formatting step 178 includes the steps of converting internal non-ASCII fields to ASCII and sending them to an output device, for example, to one or more of electronic mail facility 50, hard copy printing device 52, network 48, storage device 44, communications link 46, and display monitor device 54.

A technical advantage of the present embodiment is that it improves on previous misuse detection systems by minimizing the number of false positive detections. The present embodiment achieves this result by creating signatures from undesirable activities including known attack outcomes, known system vulnerabilities, and known attack procedures. Since a misuse is only reported on a direct match to a known bad result, the probability of falsely reporting a misuse is less than that of the previous anomaly detection mechanisms.

An additional technical advantage of the invention is that it eliminates the need for expert programming in knowledge-based or rule-based systems. The signatures are generated by a programmer and are loadable at program initiation. System programmers are capable of creating their own misuse signatures from their particular known attack procedures, attack outcomes, and known system vulnerabilities. Misuse signatures are deterministic, which means that given a set of inputs the output is predictable. This is because of the well-defined elements of the signature. The initial state 112, transition functions 114, states 116 and the end state 118 create a flexible but concrete structure within which to program signatures. This is unlike expert systems that describe behavioral scenarios through a rule-based approach that leads to inexact and unpredictable results.

A third technical advantage of the invention is that it uses an efficient match and compare method to improve signature process 146. Signature data structure 108 specifically uses data in an efficient manner by including initial state 112, states 116, and end state 116 directly. Additionally, eliminating the need to maintain statistical histograms, compute statistical deviations and process rules in a knowledge-based system enables the present embodiment to process data more efficiently. Consequently, a single misuse engine 30 that employs the present embodiment can detect misuse of multiple processing systems at the same time.

OPERATION

Operation of detection system 10 of the present embodiment has already been described in significant detail. It is now appropriate, however, to briefly turn to operation from the standpoint of an actual misuse example to assist in further describing certain inventive concepts that detection system 10 provides. Moreover, Appendix A hereto provides printouts of selected modules of the one embodiment to further explain a possible operation of the present invention.

On UNIX™ systems, a common misuse is successfully gaining access to the processing system by using an account for which the intruder is not authorized. The misuse is defined as an unauthorized access to another person's or company's account. Deciding how to represent this misuse as a signature data structure 108 provides an initial consideration for a detection system 10 user. An example of this signature in colloquial terms is four unsuccessful logins within ten minutes followed by a successful login.

Implementing this in signature data structure 108 yields an initial state 112 that includes an unsuccessful remote login, an unsuccessful local login, and an unsuccessful dial-up login. The first transition function 114 sets the time to zero and watches for the next unsuccessful login. The states consist of all the possible types of unsuccessful logins. There is one state for each of the 2nd, 3rd and 4th unsuccessful logins. The transition function 114 checks for time less than ten minutes and an unsuccessful login. If either the time exceeds ten minutes or a successful login occurs, the transition function 114 returns to the initial state. The final transition function from the fourth event set looks for a successful login of any type. Upon receiving a successful login, process flow transitions to the end state to determine if a fifth login is successful. Detection system 10 initializes its signature data structure from the programmer-defined signatures located in disk storage. Next an operator selects the "successful login breach" misuse from the list of predefined misuses displayed on his display monitor 22. The operators selection is correlated with the signature data structure through index 110. The operator may also select report characteristics from predefined selections at his point. For login breaches, the operator may be interested in the time that the breach occurred, the locations of physical device from which the breach occurred, and the name or identification of the account that was breached. The operator can also specify where to send the report.

Next, detection system 10 begins processing the available audit trail records from audit trail records source 18 to determine whether any login accounts have been compromised. Audit trail records are compared to the initial states 112 until an unsuccessful login occurs. Transition functions 114 control the match and compare operations. The transition functions 114 watch for additional unsuccessful logins within the ten minute period. If four unsuccessful logins occur, the transition function 114 watches for a successful login. This is the end state condition. The misuse output report 42 is generated according to the criteria selected by the operator and prints the time, account, and location of the break-in and sends it to the operator-specified output device. A signal may also be generated for further processing, for example, by notification systems or an alarm system.

If there is more audit data to be processed, the transition function 114 from the end state 118 resets the processing at the initial state 112. The processing continues until there is no more audit trail data from audit trail records source 18 to be examined.

In summary, there is provided by the present embodiment a detection system 10 for computer-implemented methods of intrusion and misuse detection for processing systems including a method for using processing system inputs to form events, processing the events by the misuse engine according to a set of selectable misuses, and generating one or more misuse outputs. The method converts system-generated inputs to events by establishing a first data structure for use by the system which stores the event. The data structure has elements including (1) authentication information; (2) subject information; and (3) object information. The method further extracts from system audit trail records, system log file data, and system security state data the information necessary for the first data structure. The method includes the steps of storing the events into the first data structure. Using the signature data structure the method stores signatures and maps between signatures and selectable misuses by establishing a second data structure for use by the misuse engine. The second data structure includes an initial state for each selectable misuse, an end state for each selectable misuse, and one or more sets of transition functions for each selectable misuse. In addition, the method encompasses forming the second data structure to include one or more sets of states for each selectable misuse. The states can include the end state or the initial state. The second data structure further may include a misuse output an index for identifying selectable misuse elements and a mechanism for loading the second data structure.

ALTERNATIVE EMBODIMENTS

There are any number of alternatives or changes in the design of which may be readily apparent to one of ordinary skill in the art. Such alternatives may not be employed in the device of the preferred embodiment for any number of reasons, such as costs and performance considerations, packaging constraints, availability of materials, arbitrary design decisions, and the like. A number of these alternatives have been mentioned above. However, it is felt that it may be worthwhile to mention several other alternatives here for purpose of example of such alternative embodiments. This is, of course, done without limitation of other embodiments which may be equally obvious to one of ordinary skill in the art, but are not mentioned here because of time and space constraints.

In one alternative embodiment of the present invention, for example, there may be multiple processing inputs to the misuse engine of the present embodiment. As such, there may be a single misuse engine that accommodates numerous processing elements use part of a local area network or wide area network. This will maintain the general integrity of the network. Thus, the invention is intended to be limited only by the claims which are meant to cover such obvious alternatives and deviations from the preferred design and embodiment.

```
/*          DETECTION SYSTEM INSTRUCTION FILE:
                       "sig.hpp"

This file is the confidential and proprietary product of Haystack
    Laboratories, Inc.  Any unauthorized use, reproduction, or transfer
    of this file is strictly prohibited.
    Copyright 1993 Haystack Laboratories, Inc.  (Subject to limited
    distribution and restricted disclosure only.)  All rights reserved.
*/
//
// dfa.hpp
// typedef RWBoolean (*DFA_NodeFuncPtr)(ItemHandle, RWCollectable**);
typedef void (*IncidentFuncPtr)(ItemHandle, DFA_History*);

class DFA_Count : public HS_StorableCollectable { public:         // data public:         // functions
    DFA_Count(int _count=0);
    DFA_Count(const DFA_Count&);
    ~DFA_Count(void);

inline int value(void) { return count; }
    inline int value(int _count) { count = _count; return count; } private:        // data
    int count;

private:        // functions

}; // DFA_Count

// description of one possible branch from a DFA node:
//     it associates a boolean function and the next node to go to
//     if the function is true for the current event
class DFA_Branch : public HS_StorableCollectable {
```

APPENDIX A

```
public:         // data
    DFA_NodeFuncPtr funcPtr;
    DFA_Node *nextNode;

public:         // functions
    DFA_Branch(void);
    DFA_Branch(char * fct_name, DFA_Node * _next);
    ~DFA_Branch(void);

RWBoolean setNextNode(DFA_Node*);

private:        // data
    RWCString funcName;
    int nextValue;

private:// functions

}; // DFA_Branch

// this describes one node in the graph for a misuse detection signature;
// it associates some bookkeeping information (a node number and a text
// string describing the node) with a list of all the possible branches
// out of this node to other nodes in the graph.
class DFA_Node : public HS_StorableCollectable { public:         // data
public:         // functions
    DFA_Node(void);
    DFA_Node(int _num, char * desc);
    DFA_Node(int _num, char *_desc, DFA_Branch * array[]);
    DFA_Node(int _num, char *_desc, HSSLinkedList *_list);
    ~DFA_Node(void);

RWBoolean addBranch(DFA_Branch*);
                // insert branch at end of list
    RWBoolean addBranchArray(DFA_Branch**);
                // add array of branches at end of list
                // requires node value of CPPNULL to null-terminate list
```

```
        void setBranchPointers(HSSLinkedList&);

DFA_Node *processEvent(ItemHandle, RWCollectable **DFA_Stuff=CPPNULL);

// access methods for private data
        inline int getNodeNumber(void) { return nodeNumber; }
        inline RWCstring& getDescription(void) { return description; } private:        // data
        int nodeNumber;
        RWCString description;

HSSLinkedList *branchList;       // List of DFA_Branch entries
        HSSLinkedListIterator *branchIterator;

private:        // functions

}; // DFA_Node class DFA : public HS_StorableCollectable {
public:
        int *eventTable;  // list of events types used by this DFA
        IncidentFuncPtr incidentHandler;

public:         // functions
        DFA(void);
        DFA(
                int _number,
                char * _name,
                int _severity,
                char * _report,
                DFA_Node * _start,
                DFA_Node * _stop,
                DFA_Node * _incident,
                DFA_Node * _array[],
                char * _fct_name,
                int * _table);
        ~DFA(void);

RWBoolean addNode(DFA_Node*);
```

```
        RWBoolean addNodeArray(DFA_Node**);    // insert node at end of list
                                               // add array of nodes at end of list
                                               // requires node value of CPPNULL to null-terminate list // access methods for private data
        inline int       getNumber(void)   { return number; }
        inline RWCString& getName(void)    { return name; }
        inline RWCString& getReportText(void) { return reportText; }
        inline int       getSeverity(void) { return severity; }
        inline DFA_Node *getStartNode(void) { return startNode; }
        inline DFA_Node *getStopNode(void)  { return stopNode; }
        inline DFA_Node *getIncidentNode(void) { return incidentNode; }
        inline void      setStartNode(DFA_Node *node) { startNode = node; }
        inline void      setStopNode(DFA_Node *node)  { stopNode = node; }
        inline void      setIncidentNode(DFA_Node *node) { incidentNode = node; } private:
        // data
        int        number;
        RWCString  name;
        RWCString  reportText;       // formatting control short      severity;         // 0..10,           // 10 is the highest/worst;
                                                         // 0 means not reported
                                                         // -1 means undefined // but used by other DFA's
        HSSLinkedList *nodeList;     // List of DFA_Nodes
        DFA_Node  *startNode;
        DFA_Node  *stopNode;
        DFA_Node  *incidentNode;

RWCString  incidentHandlerName;

private:    // functions

}; // DFA class DFA_List {
```

```
public:
    HSKeyedList *list;              // data public:                             // functions
    DFA_List(void);
    ~DFA_List(void);

DFA *getDFApointer(int) const;
    char *buildDisplayList(char*, int);

private:                            // data private:                            // functions }; // class DFA_List
```

DETECTION SYSTEM INSTRUCTION FILE:
"sig.cpp"

```
/*
    This file is the confidential and proprietary product of Haystack
    Laboratories, Inc.  Any unauthorized use, reproduction, or transfer
    of this file is strictly prohibited.
    Copyright 1993 Haystack Laboratories, Inc.  (Subject to limited
    distribution and restricted disclosure only.)  All rights reserved.
*/
//
//      dfa.cpp
//

// start class DFA_Count member functions *******************************************

DFA_Count::DFA_Count(int _count) : count(_count)
{
} // DFA_Count()

DFA_Count::DFA_Count(const DFA_Count &X) : count(X.count)
{
} // DFA_Count()

DFA_Count::~DFA_Count(void)
{
} // DFA_Count()

// end class DFA_Count member functions *******************************************

// start class DFA_Branch member functions *******************************************

DFA_Branch::DFA_Branch(void) :
        funcPtr(CPPNULL), nextNode(CPPNULL),
        funcName("default"), nextValue(-1)
{
} // DFA_Branch()

DFA_Branch::DFA_Branch(char * fct_name, DFA_Node * _next) :
        funcPtr(CPPNULL), nextNode(_next),
```

```
                funcName(_fct_name), nextValue(-1)
{
        funcPtr = getNodeFuncPtr(funcName.data());
        nextValue = nextNode->getNodeNumber();
} // DFA_Branch()

DFA_Branch::~DFA_Branch(void)
{
} // DFA_Branch()

RWBoolean DFA_Branch::setNextNode(DFA_Node *node)
{
        if (nextNode == CPPNULL) {
                if (node->getNodeNumber() != nextValue) {
                        return FALSE;
                }
                nextNode = node;
        }
        return TRUE;
} // setNextNode()

// end class DFA_Branch member functions *******************************************

// start class DFA_Node member functions *******************************************

DFA_Node::DFA_Node(void) :
        nodeNumber(-1), description("default")
{
        branchList = new HSSLinkedList;
        branchIterator = new HSSLinkedListIterator(*branchList);
} // DFA_Node()

DFA_Node::DFA_Node(int _num, char * _desc) :
        nodeNumber(_num), description(_desc)
{
        branchList = new HSSLinkedList;
        branchIterator = new HSSLinkedListIterator(*branchList);
} // DFA_Node()
```

```
DFA_Node::DFA_Node(int _num, char * _desc, DFA_Branch * _array[]) :
        nodeNumber(_num), description(_desc)
{
    branchList = new HSSLinkedList;
    addBranchArray(_array);

branchIterator = new HSSLinkedListIterator(*branchList);
} // DFA_Node()

DFA_Node::DFA_Node(int _num, char * _desc, HSSLinkedList * _list) :
        nodeNumber(_num), description(_desc), branchList(_list)
{
    if (branchList == CPPNULL) {
        branchList = new HSSLinkedList;
    } branchIterator = new HSSLinkedListIterator(*branchList);
} // DFA_Node()

DFA_Node::~DFA_Node(void)
{
    if (branchList != CPPNULL) {
        branchList->clearAndDestroy();
        delete branchList;
        branchList = CPPNULL;
    }
    if (branchIterator != CPPNULL) {
        delete branchIterator;
        branchIterator = CPPNULL;
    }
} // ~DFA_Node()

RWBoolean DFA_Node::addBranch(DFA_Branch * _branch)
{
    if (branchList->append(_branch) == rwnil) {
        ThrowError(ErrorObject(SHARE_APPEND_BRANCH_NOT), __FILE__, __LINE__);
        return FALSE;
    }
    return TRUE;
} // addBranch()
```

```
RWBoolean DFA_Node::addBranchArray(DFA_Branch *_array[])
{
        // traverse array, inserting items into branch list
        for (int i=0; _array[i] != CPPNULL; i++) {
                if (addBranch(_array[i]) == FALSE) {
                        return FALSE;
                }
        }
        return TRUE;
} // addBranchArray()

void DFA_Node::setBranchPointers(HSSLinkedList &list)
{
        DFA_Branch *branch=0;
        DFA_Node *node=0;
        HSSLinkedListIterator iter(list);

branchIterator->reset();
        while ((branch = (DFA_Branch *)(*branchIterator)()) != FALSE) {
                iter.reset();
                while (iter() != rwnil) {
                        node = (DFA_Node *)iter.key();
                        if (branch->setNextNode(node) == TRUE) {
                                break;
                        }
                }
        }
} // setBranchPointers()

// primary processing interface
DFA_Node *DFA_Node::processEvent(
        ItemHandle event,                              // Event to present to DFA
        RWCollectable **DFA_Stuff)    // local storage required by DFA
{
        DFA_Branch *nextBranch=0;            // the possible branch we are looking at // reset iterator, and hope that the next item is the first in the list
        branchIterator->reset();

// iterate through the list until we find an output branch whose
        //       associated function returns TRUE for the event and context data
        while ((nextBranch = (DFA_Branch *)(*branchIterator)()) != FALSE) {
                // if function is TRUE, go to that next node
```

```
            if ((nextBranch->funcPtr)(event, DFA_Stuff) == TRUE) {
                return nextBranch->nextNode;
            }
    }
    return this;              // return current node as default
} // processEvent()

// end class DFA_Node member functions *****************************************

// start class DFA member functions ********************************************

DFA::DFA(
    int     _number,
    char *  _name,
    int     _severity,
    char *  _report,
    DFA_Node *  _start,
    DFA_Node *  _stop,
    DFA_Node *  _incident,
    DFA_Node *  _array[],
    char *  _fct_name,
    int *   _table) :
            number(_number),
            name(_name),
            reportText(_report),
            severity(_severity),
            nodeList(CPPNULL),
            startNode(_start),
            stopNode(_stop),
            incidentNode(_incident),
            incidentHandlerName(_fct_name),
            eventTable(CPPNULL),
            incidentHandler(CPPNULL)
{
    nodeList = new HSSLinkedList;
    addNodeArray(_array);

int count=0;
    while (_table[count] != -1) {
        ++count;
    }
    eventTable = new int[count+1];
    for (int i=0; i<count; i++) {
```

```
                        eventTable[i] = _table[i];
                }
                eventTable[i] = -1;
        }
        incidentHandler = getIncidentFuncPtr(incidentHandlerName.data());
} // DFA()

DFA::~DFA(void)
{
        if (nodeList != CPPNULL) {
                nodeList->clearAndDestroy();
                delete nodeList;
                nodeList = CPPNULL;
        }
        if (eventTable != CPPNULL) {
                delete [] eventTable;
                eventTable = CPPNULL;
        }
} // ~DFA()

RWBoolean DFA::addNode(DFA_Node * _node)
{
        if (nodeList->append(_node) == rwnil) {
                return FALSE;
        }
        return TRUE;
} // addNode()

RWBoolean DFA::addNodeArray(DFA_Node * _array[])
{
        // traverse array, inserting items into node list
        for (int i = 0; _array[i] != CPPNULL; i++) {
                if (addNode(_array[i]) == FALSE) {
                        return FALSE;
                }
        }
        return TRUE;
} // addNodeArray()

// end class DFA member functions *************************************************
```

```
// start class DFA_List member functions *******************************

DFA_List::DFA_List(void) : list(CPPNULL)
{
    list = new HSKeyedList;
} // DFA_List()

DFA_List::~DFA_List(void)
{
    if (list != CPPNULL) {
        list->clearAndDestroy();
        delete list;
        list = CPPNULL;
    }
} // ~DFA_List()

DFA *DFA_List::getDFApointer(int _key) const
{
    RWCollectableInt key(_key);

DFA *listItem = (DFA *)list->findValue(&key);

return listItem;
} // getDFApointer()

char *DFA_List::buildDisplayList(char *listStr, int listSize)
{
    if (execution_mode == INTERACTIVE) {
        if ((liststr != CPPNULL) && (listSize > 0)) {
            int count = list->entries();
            if (count > 0) {
                char tmpList[80+1];
                DFA *dfaPtr=0;
                for (int index=0; index<count; index++) {
                    dfaPtr = this->getDFApointer(index);

if (dfaPtr != CPPNULL) {
                        dfaPtr->unscramble();
                        RWCString &name = dfaPtr->getName();
                        if ((strlen(liststr) + name.length() + 7) > listSize) {
                            break;
                        }
```

```
                memset(tmpList,0,sizeof(tmpList));
                sprintf(tmpList,"[%04d] %s", dfaPtr->getNumber(),
                        (char *)name.data());
                strcat(liststr, tmpList);
                strcat(liststr, listSeparator);
                dfaPtr->scramble();
            }
            dfaPtr = CPPNULL;
        }
        listStr[strlen(listStr)-1] = '\0';
    }
    return listStr;
} // buildDisplayList()

// end class DFA_List member functions *******************************************
```

```
/*
    DETECTION SYSTEM INSTRUCTION FILE:
              "select.cpp"

This file is the confidential and proprietary product of Haystack
    Laboratories, Inc. Any unauthorized use, reproduction, or transfer
    of this file is strictly prohibited.
    Copyright 1993 Haystack Laboratories, Inc.  (Subject to limited
    distribution and restricted disclosure only.)  All rights reserved.
*/
//
// cfgmuse.cpp
//

// build and display on screen a list of available misuse signatures
void ConfigureMisuseDetector::displaySigList(void)
{
    DFA_List *dfaList = new DFA_List;

if (dfaList->restoreFromDBMS() != -1) {
        char listStr[2048];
        memset(listStr,0,sizeof(listStr));

dfaList->buildDisplayList(listStr,sizeof(listStr));
        ALstAdd(win, LIST_1, 0, listStr);
    } delete dfaList;
    dfaList = CPPNULL;
} // displaySigList()

// let user select from screen list of available misuse signatures
void ConfigureMisuseDetector::selectSigs(MisuseValues &v)
{
    AUWORD count=0;
    ALstCount(win, LIST_1, &count);
    if (count > 0) {
        ALstDeselect(win, LIST_1, 0, count);
    }

HSOrderedListIterator iter(*(v.selectedSignatureList.list));
    RWCollectableInt *listItem=0;
    AUWORD index=0;
```

```
    iter.reset();
    while (iter() != rwnil) {
        listItem = (RWCollectableInt *)iter.key();
        index = listItem->value();
        AlstSelect(win, LIST_1, index, 1);
    }
} // selectSigs()
```

DETECTION SYSTEM INSTRUCTION FILE:
"report.cpp"

```cpp
/*
 * This file is the confidential and proprietary product of Haystack
 * Laboratories, Inc. Any unauthorized use, reproduction, or transfer
 * of this file is strictly prohibited.
 * Copyright 1993-94 Haystack Laboratories, Inc.  (Subject to limited
 * distribution and restricted disclosure only.)  All rights reserved.
 */

// print contents of an Event
void AuditEvent::printUserFormat(
    FILE *fp,                         // where to print
    unsigned long mask,               // which fields to print
    unsigned long obj_mask)           // which embedded objects to print
{
    Host *hostPtr = hostList[hostSelected];

if (mask != 0) {
        if (mask & print_timestamp) {
            char str[80];
            struct tm *timeStruct = localtime(&timeStamp);
            strftime(str,80,"%x %X",timeStruct);
            formatFileOutput(fp,"Time Stamp= %s, ",str);
        } if (mask & print_type) {
            formatFileOutput(fp,"Event Type= %s(%d), ", eventIdToEventName(type), type);
        }
        if (mask & print_pid) {
            formatFileOutput(fp,"Process Id= %d, ",pid);
        }
        if (mask & print_ppid) {
            formatFileOutput(fp,"Parent = %d, ",ppid);
        }
        if (mask & print_outcome) {
            if (outcome >= 0) {
                formatFileOutput(fp,"Outcome= s(%ld), ",outcome);
            }
            else {
                formatFileOutput(fp,"Outcome= f(%d), ",errno);
            }
        } if (mask & print_auserid) {
```

```
        HostUserid *uidPtr=0;
        if ((uidPtr = hostPtr->hostUseridList->findEntry(auserid)) != CPPNULL) {
            formatFileOutput(fp,"Audit Uid= %s(%d), ",
                    (const char *)uidPtr->userName.data(), auserid);
        }
        else {
            formatFileOutput(fp,"Audit Uid=ERROR(%d), ", auserid);
        }
    }
    if (mask & print_ruserid) {
        HostUserid *uidPtr=0;
        if ((uidPtr = hostPtr->hostUseridList->findEntry(ruserid)) != CPPNULL) {
            formatFileOutput(fp,"Real Uid= %s(%d), ",
                    (const char *)uidPtr->userName.data(), ruserid);
        }
        else {
            formatFileOutput(fp,"Real Uid= ERROR(%d), ", ruserid);
        }
    }
    if (mask & print_euserid) {
        HostUserid *uidPtr=0;
        if ((uidPtr = hostPtr->hostUseridList->findEntry(euserid)) != CPPNULL) {
            formatFileOutput(fp,"Effective Uid= %s(%d), ",
                    (const char *)uidPtr->userName.data(), euserid);
        }
        else {
            formatFileOutput(fp,"Effective Uid= ERROR(%d), ", euserid);
        }
    }
    if (mask & print_rgroupid) {
        HostGroupid *gidPtr=0;
        if ((gidPtr = hostPtr->hostGroupidList->findEntry(rgroupid)) != CPPNULL) {
            formatFileOutput(fp,"Real Gid= %s(%d), ",
                    (const char *)gidPtr->groupName.data(), rgroupid);
        }
        else {
            formatFileOutput(fp,"Real Gid= ERROR(%d), ", rgroupid);
        }
    }
    if (mask & print_egroupid) {
        HostGroupid *gidPtr=0;
```

```
            if ((gidPtr = hostPtr->hostGroupidList->findEntry(egroupid)) != CPPNULL) {
                formatFileOutput(fp,"Effective Gid= %s(%d), ",
                    (const char *)gidPtr->groupName.data(), egroupid);
            }
            else {
                formatFileOutput(fp,"Effective Gid= ERROR(%d), ", egroupid);
            }
        } if (mask & print_sid) {
            formatFileOutput(fp,"Session Id= %d, ",sid);
        } ifdef _MAC_SECURITY
        if (mask & print_subjectLevel) {
            formatFileOutput(fp,"subjectLevel= %d, ",subjectLevel);
        }
endif // _MAC_SECURITY if (mask & print_olist) {
            for (int j=0;j<maxAuditObject;j++) {
                if (!olist[j].name.isNull()) {
                    olist[j].printUserFormat(fp,obj_mask);
                }
            }
        } if (mask & print_optionalData) {
            if (!optionalData.isNull()) {
                formatFileOutput(fp,"Optional Data= %s, ",(char *)optionalData.data());
            }
        } formatFileOutput(fp,"\n");
        formatFileOutput(fp,"\n");
    }

} // printUserFormat()

// print contents of object embedded in an Event
void AuditObject::printUserFormat(
    FILE *fp,                                    // where to print
    unsigned long mask)                          // which fields to print
{
    if (mask != 0) {
        if (mask & print_name) {
```

```
    Event::formatFileOutput(fp,"Name= %s, ", name.data());
} if (mask & print_type) {
    switch (type) {
    case '?':
        Event::formatFileOutput(fp,"Type= file not found (%c), ",type);
        break;
    case 'f':
        Event::formatFileOutput(fp,"Type= regular file (%c), ",type);
        break;
    case 'c':
        Event::formatFileOutput(fp,"Type= character special file (%c), ",type);
        break;
    case 'b':
        Event::formatFileOutput(fp,"Type= block special file (%c), ",type);
        break;
    case 'd':
        Event::formatFileOutput(fp,"Type= directory (%c), ",type);
        break;
    case 'p':
        Event::formatFileOutput(fp,"Type= (un)named pipes (%c), ",type);
        break;
    case 'l':
        Event::formatFileOutput(fp,"Type= links (%c), ",type);
        break;
    case 's':
        Event::formatFileOutput(fp,"Type= semaphores (%c), ",type);
        break;
    case 'h':
        Event::formatFileOutput(fp,"Type= shared memory (%c), ",type);
        break;
    case 'm':
        Event::formatFileOutput(fp,"Type= messages (%c), ",type);
        break;
    case 'n':
        Event::formatFileOutput(fp,"Type= network objects (%c), ",type);
        Event::formatFileOutput(fp,"In_Addr= %s, ",_longToAddress(in_addr));
        Event::formatFileOutput(fp,"Ip_Port=%d, ",ip_port);
        break;
    default:
        Event::formatFileOutput(fp,"Type= UNKNOWN (%c), ",type);
        break;
    }
}
```

```
if (mask & print_mode) {
    Event::formatFileOutput(fp,"Mode= %04o, ",mode);
}
if (mask & print_uid) {
    Event::formatFileOutput(fp,"Uid= %d, ",uid);
}
if (mask & print_gid) {
    Event::formatFileOutput(fp,"Gid= %d, ",gid);
}
if (mask & print_level) {
    Event::formatFileOutput(fp,"Level= %s, ",level.data());
}
if (mask & print_device) {
    Event::formatFileOutput(fp,"Device= %d, ",device);
}
if (mask & print_maj) {
    Event::formatFileOutput(fp,"Major= %d, ",maj);
}
if (mask & print_min) {
    Event::formatFileOutput(fp,"Minor= %d, ",min);
}
if (mask & print_inode) {
    Event::formatFileOutput(fp,"Inode= %ld, ",inode);
}
if (mask & print_fsid) {
    Event::formatFileOutput(fp,"Fsid= %ld, ",fsid);
}
} // printUserFormat()
```

```
/*
                DETECTION SYSTEM INSTRUCTION FILE:
                           "pipe.cpp"

This file is the confidential and proprietary product of Haystack
   Laboratories, Inc. Any unauthorized use, reproduction, or transfer
   of this file is strictly prohibited.
   Copyright 1993-94 Haystack Laboratories, Inc.   (Subject to limited
   distribution and restricted disclosure only.)  All rights reserved.
*/ void Event::openEventPipe(char *pipeProcess)
{
    eventPipe = popen(pipeProcess, "w");
    if (eventPipe == CPPNULL) {
        ThrowError(ErrorObject(TRANS_PIPE_OPEN), pipeProcess, __FILE__, __LINE__);
    }
} // openEventPipe()

void Event::closeEventPipe(char *pipeProcess)
{
    if (pclose(eventPipe) == -1) {
        ThrowError(ErrorObject(TRANS_PIPE_CLOSE), pipeProcess, __FILE__, __LINE__);
    }
    eventPipe = CPPNULL;
} // closeEventPipe()

void AuditEvent::printPipeEventFormat(FILE *outPipe)
{
    // output format token
    Event::pipeStream << awk_format_token << pipeFS;

// output format
    Event::pipeStream << "Event_Type_Number" << pipeFS;
    Event::pipeStream << "Event_Type_Name"   << pipeFS;
    Event::pipeStream << "Time_Stamp"        << pipeFS;
    Event::pipeStream << "Outcome"           << pipeFS;
    Event::pipeStream << "Error"             << pipeFS;
    Event::pipeStream << "Process_ID"        << pipeFS;
    Event::pipeStream << "Parent_ID"         << pipeFS;
    Event::pipeStream << "Session_ID"        << pipeFS;
    Event::pipeStream << "Audit_Userid_Number" << pipeFS;
    Event::pipeStream << "Audit_Userid_Name"   << pipeFS;
    Event::pipeStream << "Real_Userid_Number"  << pipeFS;
    Event::pipeStream << "Real_Userid_Name"    << pipeFS;
```

```
        Event::pipeStream << "Effective_Userid_Number" << pipeFS;
        Event::pipeStream << "Effective_Userid_Name" << pipeFS;
        Event::pipeStream << "Real_Groupid_Number" << pipeFS;
        Event::pipeStream << "Real_Groupid_Name" << pipeFS;
        Event::pipeStream << "Effective_Groupid_Number" << pipeFS;
        Event::pipeStream << "Effective_Groupid_Name" << pipeFS;
        Event::pipeStream << "Subject_Level" << pipeFS;
        Event::pipeStream << "Optional_Data";

AuditObject::printPipeObjectFormat(outPipe);

Event::pipeStream << "\n";

int psize = Event::pipeStream.pcount();
        char *ptr = Event::pipeStream.str();

fwrite(ptr, 1, psize, outPipe);
        fflush(outPipe);
        Event::pipeStream.flush();
        Event::pipeStream.seekp(0);
} // printPipeEventFormat()

void AuditEvent::printPipeEventData(FILE *outPipe)
{
        Host *hostPtr = hostList[hostSelected];

// output event token
        Event::pipeStream << awk_event_token << pipeFS;

Event::pipeStream << type << pipeFS;
        Event::pipeStream << eventIdToEventName(type) << pipeFS;

char str[80];
        struct tm *timeStruct = localtime(&timeStamp);
        strftime(str,80,"%x %X",timeStruct);
        Event::pipeStream << str << pipeFS;

Event::pipeStream << outcome << pipeFS;
        int terrno = errno;
        Event::pipeStream << terrno << pipeFS;
        Event::pipeStream << pid << pipeFS;
        Event::pipeStream << ppid << pipeFS;
        Event::pipeStream << sid << pipeFS;

hostUserid *uidPtr=0;
```

```
        Event::pipeStream << auserid << pipeFS;
        if ((uidPtr = hostPtr->hostUseridList->findEntry(auserid)) != CPPNULL) {
                Event::pipeStream << (const char *)uidPtr->userName.data() << pipeFS;
        }
        else {
                Event::pipeStream << "Audit Userid Unknown" << pipeFS;
        }

Event::pipeStream << ruserid << pipeFS;
        if ((uidPtr = hostPtr->hostUseridList->findEntry(ruserid)) != CPPNULL) {
                Event::pipeStream << (const char *)uidPtr->userName.data() << pipeFS;
        }
        else {
                Event::pipeStream << "Real Userid Unknown" << pipeFS;
        }

Event::pipeStream << euserid << pipeFS;
        if ((uidPtr = hostPtr->hostUseridList->findEntry(euserid)) != CPPNULL) {
                Event::pipeStream << (const char *)uidPtr->userName.data() << pipeFS;
        }
        else {
                Event::pipeStream << "Effective Userid Unknown" << pipeFS;
        }

HostGroupid *gidPtr=0;

Event::pipeStream << rgroupid << pipeFS;
        if ((gidPtr = hostPtr->hostGroupidList->findEntry(rgroupid)) != CPPNULL) {
                Event::pipeStream << (const char *)gidPtr->groupName.data() << pipeFS;
        }
        else {
                Event::pipeStream << "Real Groupid Unknown" << pipeFS;
        }

Event::pipeStream << egroupid << pipeFS;
        if ((gidPtr = hostPtr->hostGroupidList->findEntry(egroupid)) != CPPNULL) {
                Event::pipeStream << (const char *)gidPtr->groupName.data() << pipeFS;
        }
        else {
                Event::pipeStream << "Effective Groupid Unknown" << pipeFS;
        } ifdef _MAC_SECURITY
        Event::pipeStream << subjectLevel << pipeFS;
#endif //_MAC_SECURITY
        Event::pipeStream << optionalData;
```

```
    int psize = Event::pipeStream.pcount();
    char *ptr = Event::pipeStream.str();

fwrite(ptr, 1, psize, outPipe);
    fflush(outPipe);

Event::pipeStream.flush();
    Event::pipeStream.seekp(0);

for (int index = 0; index < maxAuditobject; index++) {
        olist[index].printPipeObjectData(outPipe);
    } fwrite("\n", 1, 1, outPipe);
    fflush(outPipe);
} // printPipeEventData()

void AuditObject::printPipeObjectFormat(FILE *outPipe)
{
    Event::pipeStream << pipeFS;      // terminate preceding field Event::pipeStream << "Object_Name" << pipeFS;
    Event::pipeStream << "Object_Type" << pipeFS;

Event::pipeStream << "Object_Mode" << pipeFS;
    Event::pipeStream << "Object_Userid_Number" << pipeFS;
    Event::pipeStream << "Object_Userid_Name" << pipeFS;
    Event::pipeStream << "Object_Groupid_Number" << pipeFS;
    Event::pipeStream << "Object_Groupid_Name" << pipeFS;

Event::pipeStream << "Object_Device" << pipeFS;
    Event::pipeStream << "Object_Major" << pipeFS;
    Event::pipeStream << "Object_Minor" << pipeFS;
    Event::pipeStream << "Object_Inode" << pipeFS;
    Event::pipeStream << "Object_Fsid";

Event::pipeStream << pipeFS;      // terminate preceding field

Event::pipeStream << "Internet_Address" << pipeFS;
    Event::pipeStream << "IP_Port";
} // printPipeObjectFormat()

void AuditObject::printPipeObjectData(FILE *outPipe)
{
    if (name.isNull()) {
```

```
      return;
}

Event::pipeStream << pipeFS;        // terminate preceding field

Event::pipeStream << dec;
Event::pipeStream << name.data() << pipeFS;
Event::pipeStream << type << pipeFS;

Event::pipeStream << oct;
Event::pipeStream << mode << pipeFS;
Event::pipeStream << dec;

Event::pipeStream << uid << pipeFS;

HostUserid *uidPtr=0;
if ((uidPtr = hostList[hostSelected]->hostUseridList->findEntry(uid)) != CPPNULL)
        Event::pipeStream << (const char *)uidPtr->userName.data() << pipeFS;
else {
        Event::pipeStream << "Userid Unknown" << pipeFS;
}

Event::pipeStream << gid << pipeFS;

HostGroupid *gidPtr=0;
if ((gidPtr = hostList[hostSelected]->hostGroupidList->findEntry(gid)) != CPPNULL) {
        Event::pipeStream << (const char *)gidPtr->groupName.data() << pipeFS;
}
else {
        Event::pipeStream << "Groupid Unknown" << pipeFS;
}

Event::pipeStream << device << pipeFS;
Event::pipeStream << maj << pipeFS;
Event::pipeStream << min << pipeFS;
Event::pipeStream << inode << pipeFS;
Event::pipeStream << fsid;

Event::pipeStream << pipeFS;        // terminate preceding field

Event::pipeStream << longToAddress(in_addr) << pipeFS;
Event::pipeStream << ip_port;
```

```
int psize = Event::pipeStream.pcount();
char *ptr = Event::pipeStream.str();

fwrite(ptr, 1, psize, outPipe);
fflush(outPipe);

Event::pipeStream.flush();
Event::pipeStream.seekp(0);
} // printPipeObjectData()
```

DETECTION SYSTEM INSTRUCTION FILE:
"getevent.cpp"

```cpp
/*
    This file is the confidential and proprietary product of Haystack
    Laboratories, Inc. Any unauthorized use, reproduction, or transfer
    of this file is strictly prohibited.
    Copyright 1991-94 Haystack Laboratories, Inc.  (Subject to limited
    distribution and restricted disclosure only.)  All rights reserved.
*/

// parse SVR4 auditrpt-formatted buffer into event e
AT_status SVR4_AuditSource::parseRecord(ItemHandle e)
{
    char *list[10];
    memset(list,0,sizeof(list));

int listCount = splitIntoList(COMMA, DQUOTE, 10, inputBuffer, list);
    if (listCount == -1) {
        ThrowError(ErrorObject(SHARE_HEAP_CORRUPT), __FILE__, __LINE__);
        setErrorStatus(errno);
        return AT_ERROR;
    } eventPool->refItem(e).timeStamp = SVR4_time_to_DOS_time_t(list[0]);

eventPool->refItem(e).type = SVR4EventNumber(list[1]);

list[2] = stripFirst(list[2]);
    eventPool->refItem(e).pid = atol(list[2]);

if (list[3][0] == 's') {
        eventPool->refItem(e).errno = (char)0;
        eventPool->refItem(e).outcome = atol(&list[3][2]);
    }
    else if (list[3][0] == 'f') {
        eventPool->refItem(e).errno = (char)atol(&list[3][2]);
        eventPool->refItem(e).outcome = -1;
    } char *uids[10];
    memset(uids,0,sizeof(uids));
    int uidsCount = splitIntoList(COLON, DQUOTE, 10, list[4], uids);
    switch (uidsCount) {
        case 1: {
```

```
            eventPool->refItem(e).ruserid = atoi(uids[0]);
        }
        break;
    case 2: {
            eventPool->refItem(e).ruserid = atoi(uids[0]);
            eventPool->refItem(e).euserid = atoi(uids[1]);
        }
        break;
    case 3: {
            eventPool->refItem(e).auserid = atoi(uids[0]);
            eventPool->refItem(e).ruserid = atoi(uids[1]);
            eventPool->refItem(e).euserid = atoi(uids[2]);
        }
        break;
    } char *gids[20];
    memset(gids,0,sizeof(gids));
    int gidsCount = splitIntoList(COLON, DQUOTE, 20, list[5], gids);
    switch (gidsCount) {
    case 1: {
            eventPool->refItem(e).rgroupid = atoi(gids[0]);
        }
        break;
    default: {
            eventPool->refItem(e).rgroupid = atoi(gids[0]);
            eventPool->refItem(e).agroupid = atoi(gids[1]);
        }
        break;
    } list[6] = stripFirst(list[6]);
    eventPool->refItem(e).sid = atoi(list[6]);

eventPool->refItem(e).subjectLevel = 0;

char *objs[4];
    memset(objs,0,sizeof(objs));
    int objsCount = splitIntoList(RPAREN, DQUOTE, 4, list[8], objs) - 1;
    for (int i=0; i<objsCount; i++) {
        eventPool->refItem(e).incrementObjectCount();
```

```c
    objs[i] = stripFirst(objs[i]);

char *objlist[10];
    memset(objlist,0,sizeof(objlist));
    int objlistCount = splitIntoList(COLON, DQUOTE, 10, objs[i], objlist);
    if ((objlistCount != -1) && (*objlist[0] != COLON)) {
        if (objlist[0][0] == '\"') {
            objlist[0] = stripFirstLast(objs[i]);
        } eventPool->refItem(e).olist[i].name = objlist[0];
        eventPool->refItem(e).olist[i].type = *objlist[1];
        eventPool->refItem(e).olist[i].level = objlist[2];

if ((objlist[3] != CPPNULL) && (*objlist[3] !=CPPNULL)){
            eventPool->refItem(e).olist[i].device=atol(objlist[3]);
        } if ((objlist[4] != CPPNULL) && (*objlist[4] != CPPNULL))
            if (*objlist[1] == 'n') {
                eventPool->refItem(e).olist[i].in_addr = strtol(objlist[4],(char **)0,16);
            }
            else {
                eventPool->refItem(e).olist[i].maj = atol(objlist[4]);
            }
        } if ((objlist[5] != CPPNULL) && (*objlist[5] != CPPNULL)) {
            if (*objlist[1] == 'n') {
                eventPool->refItem(e).olist[i].ip_port = atoi(objlist[5]);
            }
            else {
                eventPool->refItem(e).olist[i].min = atol(objlist[5]);
            }
        }
        if ((objlist[6] != CPPNULL) && (*objlist[6] != CPPNULL)) {
            eventPool->refItem(e).olist[i].inode = atol(objlist[6]);
        }
        if ((objlist[7] != CPPNULL) && (*objlist[7] != CPPNULL)) {
            eventPool->refItem(e).olist[i].fsid = atol(objlist[7]);
        }
    }
}
```

```
        }
    if (list[9] != CPPNULL) {
        eventPool->refItem(e).optionalData = list[9];
    }
    eventPool->refItem(e).hostId = currentHostId;

return AT_OK;
    parseRecord()
} // parseRecord()
```

What is claimed is:

1. A system for detecting intrusion into and misuse of a processing system, comprising:

a process input mechanism for receiving a plurality of process relating inputs to processing system access;

a selectable misuse mechanism connected to said process input mechanism for receiving a plurality of selectable misuses from at least one controllable input source, said at least one controllable input source comprising one or more of a user input device, a processing system program, a processing system memory device, and a processing system storage device;

a misuse engine connected to said selectable misuse mechanism for receiving said plurality of process inputs from said process input mechanism and said plurality of selectable misuses from said selectable misuse mechanism, said misuse engine comprising a signature process mechanism for comparing and matching said process inputs to multiple misuses of said plurality of selectable misuses simultaneously; and an output mechanism connected to said misuse engine for generating an output when said misuse engine locates a match between at least one of said plurality of process inputs and at least one of said plurality of selectable misuses, said output indicating an intrusion into or misuse of the processing system.

2. The system of claim 1, wherein said process input mechanism further comprises a receiving mechanism for receiving said plurality of process inputs from one or more of a security state data source, a log file data source, and an audit trail records source.

3. The system of claim 1, wherein said misuse engine further comprises a conversion mechanism for converting each of said plurality of process inputs into an event having a predetermined event data structure, said predetermined event data structure comprising an authentication information module, a subject information module, and an object information module.

4. The system of claim 3, wherein said signature process mechanism of said misuse engine further comprises a signature data structure forming mechanism for forming a signature data structure, said data structure for mapping between said event data structure and at least one of said plurality of selectable of misuses.

5. The system of claim 4, wherein said signature data structure comprises:

an initial state for each of said plurality of misuses;

at least one transition function for describing a sequence of actions derived from events representing a component of a processing system misuse or intrusion;

at least one state for representing a sequence of said at least one transition functions resulting in a completed component of said processing system misuse or intrusion;

an end state representing the culmination of the said at least one transition function and said at least one state in an actual processing system misuse or intrusion; and a trigger in said signature process mechanism so that as said signature process mechanism receives said event data structure and compares it to the signature data structure state the transition function is triggered when said event data structure matches said signature data structure state.

6. A system method for detecting intrusion into and misuse of a processing system, comprising the steps of:

receiving a plurality of process inputs relating to process system access using a process input mechanism;

receiving a plurality of selectable misuses from at least on controllable input source using a selected misuse input mechanism, said controllable input source comprising one or more of a user input device, a processing system program, a processing system memory, and a processing system storage device;

receiving said plurality of process inputs from said process input mechanism and said plurality of selectable misuses from said selectable misuse input mechanism using and providing as input said plurality of process inputs and said plurality of selectable misuses to a misuse engine connected to said misuse mechanism;

comparing and matching said process inputs to multiple misuses of said plurality of selectable misuses simultaneously using a signature process mechanism within the misuse engine; and generating an output using an output mechanism when said misuse engine locates a match between at least one of said plurality process inputs and at least one said plurality of selectable misuses, said output indicating an intrusion into or misuse of the processing system.

7. The method of claim 6, further comprising the step of receiving said plurality of process inputs in said process input mechanism from one or more of a security state data source, a log file data source, and an audit trail record source.

8. The method of claim 6, further comprising the step of converting each of said plurality of process inputs into an event having a predetermined event data structure within said misuse engine, said event data structure comprising an authentication information module, a subject module, and an object information module.

9. The method of claim 8, further comprising the step of forming a signature data structure in the signature process mechanism for mapping between said event data structure and at least one of said plurality of selectable misuses.

10. The method of claim 9, wherein said signature data structure forming step further comprises the steps of:

relating an initial state to at least one of said plurality of selectable misuses;

describing a sequence of actions representing a processing system misuse or intrusion using at least one transition function;

representing elements in the sequence of elements resulting in a processing system misuse or intrusion using at least one state; and representing the last state occurring prior to performing said output generating step using an end state within said signature data structure.

11. An improved data processing system having the ability to detect data processing system intrusion and misuse, comprising:

a processing system for processing instructions and data;

a process input mechanism connected to said processing system for receiving a plurality of process inputs relating to access to said processing system;

a selectable misuse input mechanism connected to said process input mechanism for receiving a plurality of selectable misuses from at least one controllable input source, said at least one controllable input source comprising one or more of a user input device, a processing system program, a processing system memory device, and a processing system storage device;

a misuse engine connected to said selectable misuse input mechanism for receiving said plurality of process inputs from said process input mechanism and said plurality of selectable of misuses from said selectable misuse input mechanism, said misuse engine comprising a signature process mechanism for comparing and matching ones of said process inputs that relate to intrusions into or misuses of the processing system to multiple misuses of said plurality of selectable of misuses simultaneously; and an output mechanism connected to said misuse engine for generating an output when said misuse engine locates a match between at least one of said plurality of process inputs and at least one of said plurality of selectable misuses, said output indicating an intrusion into and misuse of the processing system.

12. The improved processing system of claim 11, wherein said process input mechanism further comprises a receiving mechanism for receiving said plurality of process input from one or more of a security state data source, a log file data source, and an audit trail records source.

13. The improved processing system of claim 11, wherein said misuse engine further comprises a conversion mechanism for converting each of said plurality of process inputs into an event having a predetermined event data structure, said event data structure comprising an authentication information module, a subject information module, and an object information module.

14. The improved data processing system of claim 13, wherein said signature process mechanism comprises a mechanism for forming a signature data structure, said data structure for mapping between said event data structure and at least one of said selectable of misuses.

15. The improved processing system of claim 14, wherein said signature data structure further comprises:

at least one transition function for describing a sequence of actions derived from events representing a component of a processing system misuse or intrusion;

at least one state for representing a sequence of said at least one transition functions resulting in a completed component of said processing system misuse or intrusion; and an end state representing the culmination of the said at least one transition function and said at least one state in an actual processing system misuse or intrusion.

16. A method for detecting intrusion into and misuse of a processing system, comprising:

a process input mechanism for receiving a plurality of process inputs relating to processing system access;

a selectable misuse mechanism connected to said process input mechanism for receiving a plurality of selectable misuses from at least one controllable input source, said at least one controllable input source comprising a user input mechanism capable of presenting a user with a predefined list of selectable misuses, creating a set of selected misuses as a result of said user choosing from a predefined list and loading said selected misuses into said selectable misuse mechanisms;

a misuse engine connected to said selectable misuse mechanism for receiving said plurality of process inputs from said process input mechanism in said selected misuses, said misuse engine comprising a signature process mechanism for comparing and matching said process inputs to multiple misuses of said selected misuses simultaneously; and an output mechanism connected to said misuse engine for generating an output when said misuse engine locates a match to at least one of said selected misuses, said output indicating an intrusion into a misuse of the processing system.

17. A system for detecting intrusion into a processing system and misuse of a processing system, comprising:

a process input mechanism for receiving a plurality of process inputs relating to processing system access;

a selectable misuse mechanism connected to said process input mechanism for receiving a plurality of selectable misuses from at least one controllable input source, said at least one controllable input source comprising a load mechanism for automatically loading a predefined set of selected misuses into said selectable misuse mechanism;

a misuse engine connected to said selectable misuse mechanism for receiving said plurality of process inputs from said process inputs mechanism and said predefined set of selected misuses from said selectable misuse input mechanism, said misuse engine comprising a signature process mechanism for comparing and matching said process inputs to multiple misuses of said predefined set of selectable misuses simultaneously; and an output mechanism connected to said misuse engine for generating an output when said misuse engine locates a match between at least one of said plurality of process inputs and at least one of said predefined set of selected misuses, said output indicating an intrusion into or misuse of the processing system.

18. A system for detecting intrusion into and misuse of a processing system, comprising:

a process input mechanism for receiving a plurality of process inputs relating to processing system access, said process input mechanism comprising an audit record processing mechanism for converting system audit trail records into a predefined set of process inputs relating to processing system access;

a selectable misuse mechanism connected to said process input mechanism for receiving a plurality of selectable misuses from at least one controllable input source;

a misuse engine connected to said selectable misuse mechanism for receiving said predefined set of process inputs relating to said audit trail records and said plurality of selectable misuses from said selectable misuse input mechanism, said misuse engine comprising a signature process mechanism for comparing and matching said predefined set of process inputs relating to said audit trail records to multiple misuses of said selectable misuses simultaneously;

an output mechanism connected to said misuse engine for generating an output when said misuse engine locates a match between at least one of said predefined set of process inputs relating to said audit trail records and at least one of said plurality of selectable misuses, said output indicating an intrusion into or misuse of the processing system.

* * * * *